(12) United States Patent
Wredenhagen et al.

(10) Patent No.: US 7,724,304 B2
(45) Date of Patent: *May 25, 2010

(54) METHOD AND APPARATUS FOR MOTION ADAPTIVE DEINTERLACING

(75) Inventors: Finn G. Wredenhagen, Toronto (CA); Gary Cheng, Scarborough (CA); Soo Jang, Toronto (CA); Lance Greggain, Woodbridge (CA)

(73) Assignee: Pixelworks, Inc., Tualatin, OR (US)

( * ) Notice: Subject to any disclaimer, the term of this patent is extended or adjusted under 35 U.S.C. 154(b) by 988 days.

This patent is subject to a terminal disclaimer.

(21) Appl. No.: 11/456,316

(22) Filed: Jul. 10, 2006

(65) Prior Publication Data

US 2006/0238650 A1   Oct. 26, 2006

Related U.S. Application Data

(63) Continuation of application No. 10/834,760, filed on Apr. 28, 2004, now Pat. No. 7,098,958, and a continuation of application No. 09/948,721, filed on Sep. 10, 2001, now Pat. No. 6,757,022.

(30) Foreign Application Priority Data

Sep. 8, 2000    (CA) ................................. 2317870
Apr. 18, 2001   (CA) ................................. 2344615

(51) Int. Cl.
*H04N 7/01*    (2006.01)
*H04N 11/20*   (2006.01)

(52) U.S. Cl. .................. 348/452; 348/448; 348/620

(58) Field of Classification Search .............. 348/448, 348/441, 446, 451, 452, 620, 607, 624; 382/260, 382/261, 266, 298–300; *H04N 7/01, 11/20, H04N 5/21*
See application file for complete search history.

(56) References Cited

U.S. PATENT DOCUMENTS

| | | | |
|---|---|---|---|
| 4,282,546 A | 8/1981 | Reitmeier | |
| 4,419,693 A | 12/1983 | Wilkinson | |
| 4,573,070 A | 2/1986 | Cooper | |
| 4,656,514 A | 4/1987 | Wilkinson et al. | |
| 4,661,850 A | 4/1987 | Strolle et al. | |
| 4,673,978 A | 6/1987 | Dischert et al. | |
| 4,675,735 A | 6/1987 | Wilkinson et al. | |
| 5,023,919 A | 6/1991 | Wataya | |
| 5,029,108 A | 7/1991 | Lung | |
| 5,424,780 A | 6/1995 | Cooper | |
| 5,475,438 A | 12/1995 | Bretl | |

(Continued)

OTHER PUBLICATIONS

U.S. Appl. No. 10/793,882, filed Jun. 10, 2004, Cooper.

*Primary Examiner*—Sherrie Hsia
(74) *Attorney, Agent, or Firm*—Marger Johnson & McCollom, P.C.

(57) ABSTRACT

An adaptive filter calculates a target pixel from an interlaced video signal. The video signal comprises a plurality of frames, each of which comprises an even and an odd field. The filter comprises a quantized motion calculator and a filter selector. The quantized motion calculator estimates an amount of motion about the target pixel. The filter selector selects a filter in accordance with the estimated amount of motion. The filter applies a first weighting factor to a plurality of current field pixels and a second weighting factor to a plurality of previous field pixels for creating the target pixel.

20 Claims, 11 Drawing Sheets

U.S. PATENT DOCUMENTS

| | | |
|---|---|---|
| 5,563,963 A | 10/1996 | Kaplan et al. |
| 5,625,421 A | 4/1997 | Faroudja et al. |
| 5,712,687 A | 1/1998 | Naveen |
| 5,793,435 A | 8/1998 | Ward et al. |
| 5,929,918 A | 7/1999 | Marques Pereira et al. |
| 5,943,099 A | 8/1999 | Kim |
| 6,016,164 A | 1/2000 | Kawaguchi et al. |
| 6,118,488 A | 9/2000 | Huang |
| 6,118,489 A | 9/2000 | Han et al. |
| 6,141,056 A | 10/2000 | Westerman |
| 6,151,363 A | 11/2000 | Burl et al. |
| 6,201,577 B1 | 3/2001 | Swartz |
| 6,414,719 B1 | 7/2002 | Parikh |
| 6,529,637 B1 | 3/2003 | Cooper |
| 6,870,964 B1 | 3/2005 | Cooper |
| 2002/0085125 A1 | 7/2002 | Cooper |

"X" DENOTES DON'T CARE

QMOTION PATTERN 1

LEGEND { ★ STATIC
☆ DON'T CARE

QMOTION PATTERN 2

LEGEND { ★ STATIC
☆ DON'T CARE

QMOTION PATTERN 3

LEGEND { ★ STATIC
☆ DON'T CARE

QMOTION PATTERN 4

LEGEND { ★ STATIC
☆ DON'T CARE

QMOTION PATTERN 5

LEGEND { ★ STATIC, ☆ DON'T CARE }

QMOTION PATTERN 6

LEGEND { ★ STATIC, ☆ DON'T CARE }

METHOD AND APPARATUS FOR MOTION ADAPTIVE DEINTERLACING

This application is a continuation of U.S. patent application Ser. No. 10/834,760, filed Apr. 28, 2004, now issued U.S. Pat. No. 7,098,958, which claims priority from U.S. patent application Ser. No. 09/948,721, now issued U.S. Pat. No. 6,757,022, filed Sep. 10, 2001, both of which we incorporate by reference.

The present invention relates generally to a video format conversion system, and in particular to a video format conversion system for converting interlaced video to progressive video and interlaced video to interlaced video of a different size.

BACKGROUND OF THE INVENTION

Interlaced signals are generated from a line-by-line scan of an image scene. The signals are generated by scanning and transmitting every other line of the image scene. In this way, even lines of the image scene are scanned and transmitted and then odd lines are scanned and transmitted. The even and odd lines in the image scene are referred to as the even field and the odd field, respectively. A time delay between the image scene capture of the even and odd fields is approximately one sixtieth of a second. A combination of the even field and the odd field is often referred to as a frame of image data. The frame comprises information required to represent the entire image scene.

At an interlaced monitor, the fields are displayed by alternately rendering the information in the even field to the even lines on the monitor and the information in the odd field to the odd lines on the monitor. The overall effect, as perceived by a viewer, is the complete reconstruction of the image scene. That is, the image scene appears to contain all vertical information. Despite the apparent reconstruction, displaying interlaced video signals has several drawbacks, which include introducing artifacts associated with interlaced signals.

Alternately, the interlaced signal may be deinterlaced for display on a progressive monitor. The progressive monitor displays each line of the image scene progressively. That is, each line of data is displayed in order, starting from the top row of the display and progressing row by row to the bottom. Furthermore, progressively scanned display formats present all lines in the image scene at sixty frames per second. However, interlaced video signals only transmit half of the image scene every one sixtieth of a second. Since there is no delay between the presentation of the even and odd rows of image scene information, the number of scan lines of data visible at a given instant in time is twice that which is visible in a corresponding interlaced system. Thus, there is an information shortfall during format conversion. The format conversion challenge is that of reconstructing the entire image scene at an instant in time, even though only half of it is available at that time.

Format conversion from an interlaced signal to a progressive signal may be accomplished in a number of ways. One of the simplest methods is field meshing. Field meshing is a process whereby the even field information is copied to the even lines and the odd field information is copied to the odd lines. There is no regard for the temporal delay between the even and odd fields. An obvious problem with this approach is an abhorrent visual quality that results when motion is present in the image scene. Specifically, a well known artifact referred to as "feathering" results.

Line doubling is an alternate manner of interlaced-to-progressive conversion. Line doubling involves the interpolation of missing lines based only on lines in the field available at that time. The line doubling method has several drawbacks, one of which is the complete discounting of relevant image scene information in a previous field. Line doubling can lead to flicker and to a loss of vertical detail. Flicker is usually most noticeable around hard edges such as lines and text within the image scene, and generally in areas containing fine detail.

Flicker is the result of horizontal, or near horizontal, structures in the image scene having a spatial frequency content that cannot be adequately represented by an interlaced signal because an interlaced image is sub-sampled vertically. A stationary horizontal edge, for example, lies on an even row or an odd row, at any given instant in time, in an interlaced image. Therefore, the edge frequently alternates back and forth between the even and odd field, causing a viewer to perceive the edge as flickering. Flicker reduction is important because many menus such as On Screen Displays, DVD Menus, and other forms of information containing hard (high contrast) and persistent edges need to be kept stable.

Other known artifacts of line doubling include stair-stepping. Stair-stepping occurs because an interlaced image is vertically sub-sampled. That is, not all the row information in the image scene is available at the same instant in time. The consequence is stair-stepping artifact.

Format conversion algorithms aim to minimize the artifacts that result during conversion. Conversion can take on the form of interlaced-to-interlaced conversion, or interlaced-to-progressive conversion.

Yet an alternate form of deinterlacing employs what is known as motion compensated interpolation. Motion compensated interpolation attempts to compensate for the motion in the image scene by identifying regions or groups of pixels in a previous field and placing them in their correct spatial orientation relative to the current field. Such methods usually employ a block matching strategy that aims to minimize a measurement function aided by a computed motion vector. Such strategies often depend upon vast computational resources to operate effectively, and even then, mismatching errors can result. Mismatches can be perceptually dissatisfying to a viewer, especially when a portion of the image content is placed in the wrong part of the target image.

U.S. Pat. No. 6,141,056 issued to Westerman discloses a video format conversion system for converting interlaced video into progressive video using motion compensation. However, the system described by Westerman involves calculating derivatives and intervals of various quadratic functions. Such a system still requires huge computational power. Furthermore, research has shown that adjusting the filters based solely on motion information results in blotchy processed sequences.

Several format conversion solutions pertaining to deinterlacing involve a technique called vertical-temporal (VT) filtering. This technique is used in an attempt to deal with the problems that arise due to the sub-sampled nature of interlaced video. The basic idea behind VT filtering is to combine pixels in adjacent fields by numerical interpolation in order to compute a target pixel in the processed (deinterlaced) image. However, these methods cannot scale and deinterlace simultaneously. Nor do they deal that effectively with the artifacts inherent in interlaced images, namely flicker, stair-stepping and especially artifacts that are motion-related such as feathering.

Therefore, it is an objective of the present invention to obviate or mitigate at least some of the above-mentioned disadvantages.

SUMMARY OF THE INVENTION

Motion Adaptive Vertical Temporal (MAVT) filtering is useful in format conversion. Format conversion takes on the form of interlaced-to-progressive scan or interlaced-to-interlaced (reinterlacing) conversion in which scaling and deinterlacing, and scaling and reinterlacing occur simultaneously. A MAVT filter combines pixel information for adjacent fields. The MAVT adjusts a multi-dimensional filter to alter the contribution from each pixel in the adjacent fields for determining a target pixel. The format conversion method examines various aspects of the pixel information content in the image scene. Pixels are examined in a neighborhood about the interpolated target pixel along several axes. These axes include, among others, a spatio-temporal axis, a noise axis, a motion axis, and an image structure axis, such as lines and edges. In addition, historic information from previous pixel data is used to help determine the best set of coefficient weights to apply to the source image data in order to generate the target pixel during format conversion.

In accordance with an aspect of the present invention, there is provided an adaptive filter for calculating a target pixel from an interlaced video signal comprising a plurality of frames. Each of the frames comprises an even and an odd field. The filter comprises a quantized motion calculator for estimating an amount of motion about said target pixel and a filter selector for selecting a filter in accordance with the estimated amount of motion. The filter applies a first weighting factor to a plurality of current field pixels and a second weighting factor to a plurality of previous field pixels for creating the target pixel.

In accordance with a further aspect of the invention, there is provided a feathering detector for detecting a feathering artifact in adjacent odd and even fields about a target pixel. The feathering detector comprises a contour selector, a difference calculator and a plurality of predefined thresholds. The contour selector selects from a plurality of contours, including non-linear contours. The difference calculator calculates a plurality of differences between pixels along the selected contour. The plurality of predefined thresholds are compared with the calculated differences for determining if feathering exists about the pixel. Including non-linear contours among the contour selection improves feathering detection in arbitrary shapes.

In accordance with yet a further aspect of the invention, there is provided a method for selecting a filter for calculating a target pixel from an interlaced video signal. The signal comprises a plurality of frames, each of which comprise an even and an odd field. The method comprises the steps of estimating an amount of motion between consecutive frames about the target pixel, detecting feathering between consecutive fields, detecting vertical edges about said target pixel, and detecting patterns indicative of motion and patterns indicative of no motion. The estimated amount of motion is adjusted in accordance with the feathering, edge and pattern detection, and a filter is selected accordingly. A first weighting factor is applied to a plurality of current field pixels and a second weighting factor is applied to a plurality of previous field pixels for creating the target pixel.

BRIEF DESCRIPTION OF THE DRAWINGS

The present invention will be described by way of example only with reference to the following drawings in which:

FIG. 13b is a matching motion pixel pattern in the Motion Space for the edge in FIG. 13a;

FIG. 13c is a disqualification motion pixel pattern in the Motion Space for the edge in FIG. 13a.

DETAILED DESCRIPTION OF THE PREFERRED EMBODIMENTS

Figure 1:
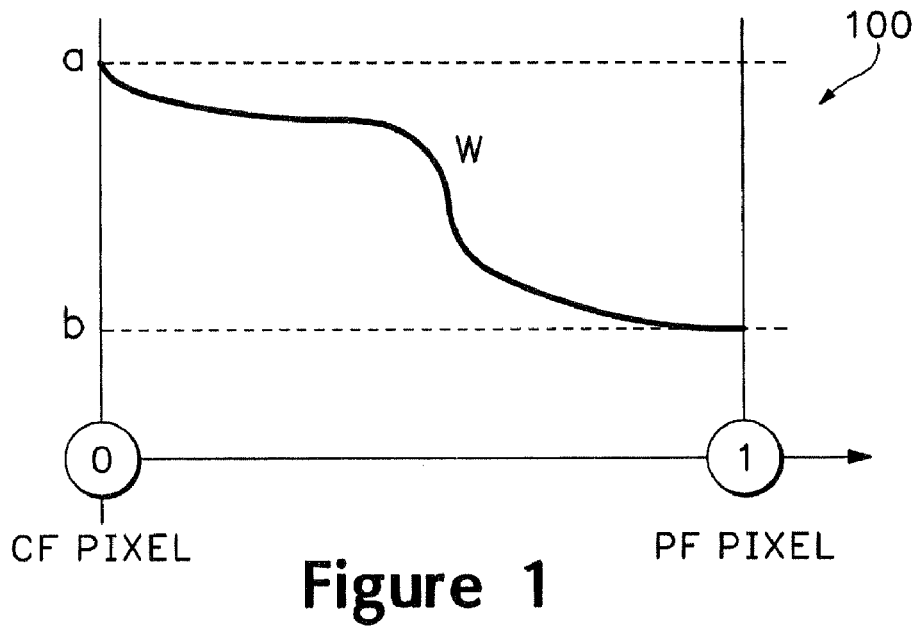
FIG. 1 is an illustration of the phases-dependent weighting function used during the design stage of the Motion Adaptive Vertical Temporal filters.

The following description can be applied to a method of format conversion for interlaced-to-progressive scan conversion (deinterlacing) and a method of interlaced-to-interlaced conversion (reinterlacing) that simultaneously scales and deinterlaces or scales and reinterlaces. The latter is a requirement for format conversion where the source image format and the target image format are not necessarily the same. The methodology used is based on what will be referred to as motion-adaptive vertical-temporal (MAVT) filtering.

MAVT filtering uses inter-field interpolation to compute a target pixel value. That is, image pixel data is combined from both the current field (CF) and the previous field (PF) to compute the target pixel. In addition, information derived from several past fields is used to assist the decision making process.

The MAVT filtering approach described herein emphasizes either the CF pixel data or the PF pixel data, depending on the degree of estimated inter-field motion and inter-frame motion. For instance, should it be determined that substantial inter-field motion has occurred between the CF and the PF, the MAVT filter places greater emphasis on the CF and less on the PF when computing the target pixel. Additionally, the relative emphasis on the CF or the PF is based on the presence of structures in the image scene such as lines and edges.

It is computationally expensive to achieve absolute certainty about the direction and magnitude of inter-field motion for any given object of an arbitrary image scene. However, it is possible to compute relative degrees of certainty of apparent motion for pixel regions in the image. Therefore, while "proper" motion vectors are not estimated, motion in the image scene is inferred from temporal changes in pixel values. When temporal changes are examined in a neighborhood (or cluster) about the target pixel, it is possible to surmise whether there has been a change in the image scene indicating motion.

Typically, if motion is detected, there is little benefit in including the PF pixel data as an equal partner to the CF when computing the target pixel. Including the PF pixel data incorrectly in such a circumstance may have an undesirable visual impact on image quality. Alternately, if there is no inter-field motion between the CF and the PF in the region of interest, or neighborhood, then it is desirable that both the CF and the PF are included as relatively equivalent partners to compute the target pixel. Therefore, CF and PF pixels are weighted in accordance with the motion of the image scene for calculating the target pixel.

If the region of the image scene in question can be considered static, both the relevant PF pixels and the CF pixels have equivalent weighting. Consequently, it may be assumed that both the CF and the PF have been drawn from the same image scene. Moreover, if an edge is part of the image scene, the same edge appears in both the CF and the PF, and there is no inferred inter-field motion, then the manner in which the MAVT filter responds is different again. In this circumstance, the MAVT filter attempts to stabilize the edge in order to reduce line flicker, also called edge flicker or local area flicker.

Therefore, when deinterlacing an interlaced source to render a progressive output image, it is useful to know which portions, if any, of the interlaced source are static and which are in motion. Such knowledge, when properly exploited, results in a deinterlaced, and possibly scaled image that has greater visual quality. That is, artifacts resulting from the deinterlacing process are fewer than there would have been had no static or motion information been incorporated into the decision process.

Furthermore, the distance between the target pixel and the nearest and most appropriate pixel in both the PF and CF contributes to the weighting of the CF and PF pixels. It may be visually beneficial to weight the relevant PF pixels more heavily then the accompanying CF pixels, and vice versa. This introduces the notion of a phase-dependent, vertical-temporal, weighted filter.

The Motion-Adaptive Vertical-Temporal Filter

The MAVT filter adjusts its frequency characteristics in both the spatial and temporal dimensions to achieve an improved deinterlaced image. The MAVT filter is a multidimensional polyphase implementation that is adaptive and non-linear and it is nonseparable in general. The MAVT filter adjusts the frequency response of the:
  i) CF component of the MAVT filter;
  ii) PF component of the MAVT filter, and;
  iii) Temporal component of the MAVT filter.

These three components can be controlled more or less independently of one another provided the overall gain of the MAVT filter is properly normalized. Further, the MAVT filter can be adjusted on a pixel-by-pixel basis during processing.

For example, if a region of interest about the target pixel is deemed "static", the most appropriate VT filter will be applied to generate the target pixel. Alternately, if the degree of inferred motion is high in the region of interest about a target pixel, then the MAVT filter may choose to weigh the CF component more heavily than other wise.

The MAVT filter achieves this variability in behavior by adjusting the filter coefficient weights in an adaptive manner depending on a number of conditions. These conditions shall be enumerated later.

The mathematical structure of the MAVT filter is as follows:

$$MAVTF(\phi,m,s,n,t)=W(\phi,m,s,n,t)*CFF(\phi,m,s,n,t)+(1-W(\phi,m,s,n,t))*PFF(\phi,m,s,n,t)$$ Equation 1

MAVTF($\phi$, m, s, n, t) is the motion-adaptive vertical-temporal filter used to compute the interpolated target pixel. It comprises a number of sub-components. Namely, a current field filter CFF($\phi$, m, s, n, t), a previous field filter PFF($\phi$, m, s, n, t), and a weighting function W($\phi$, m, s, n, t). The variables for these functions include a phase $\phi$ that corresponds to a discrete polyphase filter implementation, wherein the phase is (without loss of generality) taken to reside in the interval [0,1]. Inter-pixel distance is taken as unity and the phase $\phi$ measures the distance of a target pixel from an appropriate source pixel.

A degree of inferred motion m is determined in a neighborhood about the target pixel. Structural information s in the image scene, as well as a degree n of estimated noise in the image scene, is determined in a neighborhood about the target pixel. The inclusion of time t as a variable indicates that the determination of the MAVT filter is time dependent.

The weighting function W in Equation 1 above is a function of the phase $\phi$. Therefore, irrespective of the other parameters upon which it depends, the weighting factor can vary with the phase $\phi$. The ability to modulate the weighting function with respect to the phase of the target pixel in a polyphase implementation is beneficial for reducing flicker. Referring to FIG. 1, an exemplary phase dependency is illustrated generally by numeral 100. As the phase $\phi$ increases towards 1, the target pixel depends less on the CF source pixel and more on the PF source pixel. An arbitrary curve defines how the DC component of the current field filter and the previous field filter can be allocated. Yet, depending on the content of the image and the image sequence history, the weighting function W will vary.

Thus, the MAVT filter is an adaptive, non-linear filter that is a function of several explicit variables. These variables are, in turn, complicated functions that depend on several user-defined and programmable thresholds, specific patterns, as well as aggregated historical information. Typically, only the phase $\phi$ is directly computable. The other parameters are estimated using decision blocks.

MAVT filtering reduces feathering and flicker. The image enhancements that result due to MAVT processing are improved temporal response, temporal sharpness, spatial detail, and noise reduction.

For the purposes of clarity of the description, it is assumed that each phase in the polyphase implementation of the CFF and the PFF has been normalized to have a DC component of unity. In general, however, this is not required. Suppose, for example, that the CFF contributes 120% to the DC content of the MAVT filter. Therefore, W is 1.2 and constant. This forces the PFF to contribute a DC gain of −0.2 for all phases. The overall effect is that of a temporal high-pass filter which results in sharper temporal edges. Further, for less PF detail to be apparent in the computed target pixels, the frequency response of the PFF is adjusted to exclude higher frequencies. That is, the PFF is adaptively softened.

However, applying a vertical temporal filter with a fixed amount of DC contribution for the CFF and the PFF will not produce visually pleasing results. For example, if the filter described above is applied to static portions of the image that contains fine detail, such as edges, undesirable flicker will result. Therefore, preferably both the DC contribution and the frequency response of the filters vary.

It is further preferable that the MAVT filter does not make decisions based solely on a single pixel's information. Rather, the MAVT filter uses a neighborhood of pixels about a target pixel and their aggregated historical information to determine a set of vertical temporal coefficients best suited for a given situation. Several vertical temporal filters that are applicable to different situations in the image scene (motion, static edges, etc.) are available. One of these filters is applied depending on the outcome of various conditions as determined by a plurality of logical decision blocks.

The MAVT Algorithm

The algorithm implemented by the MAVT filter is described below. The primary function of the algorithm is to determine the weighting quantity W and the most appropriate frequency responses for the CFF and the PFF in Equation 1. The algorithm can be divided into the following six steps:

i) Motion structure determination;
ii) Edge and level determination;
iii) Edge structure determination;
iv) Static pixel determination;
v) Static pixel disqualification; and,
vi) Filter selection.

Figure 2A:
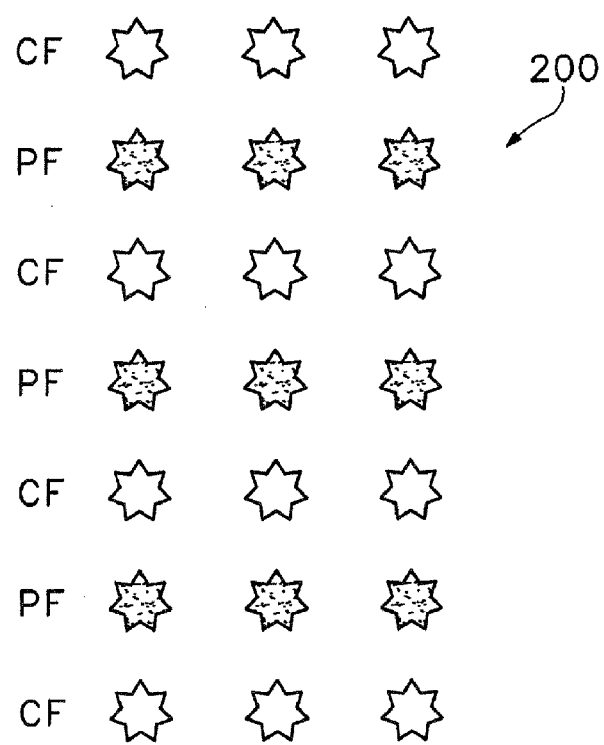
FIG. 2a is an illustration of a 7 by 3 array of pixels indicating the relative spatial positioning of the current field relative to the previous field of video.

For simplicity, and for the purposes of this description, the algorithm operates on a seven by three (7×3) window of pixels, referred to as a decision window. Note that the concepts described herein are easily extended to larger windows. Image data pixels flow through the decision window as the image is examined. Referring to FIG. 2a, a 7×3 decision window is illustrated generally by numeral 200. The decision window comprises interlaced data from the current field (CF) and the previous field (PF). The CF has a 4×3 window of pixels available, and the PF has a 3×3 window of pixels available.

The algorithm operates on the data from all components (channels) in a color space. For instance, in the YUV colour space, there are three channels, each corresponding to one of luminance, hue, and saturation for each pixel. In an RGB based colour space, there are three channels, each representing the red (R), green (G) and blue (B) components, respectively. Application to other colour spaces will become apparent to a person skilled in the art.

The CF and the PF constitute several rows of image scene data in the form of a two dimensional array, or matrix. A pixel's location in the current field is referred to as CF(i,j), which corresponds to the ith row (vertical position) and the jth column (horizontal position). Similarly, pixels in the previous field are referred to as PF(i,j). The CF and PF fields are interleaved (or interlaced). That is, the CF and PF do not represent or occupy the same spatial position in the image scene. Rather, they are vertically offset by one inter-pixel distance, normally taken to be unity.

Figure 2B:
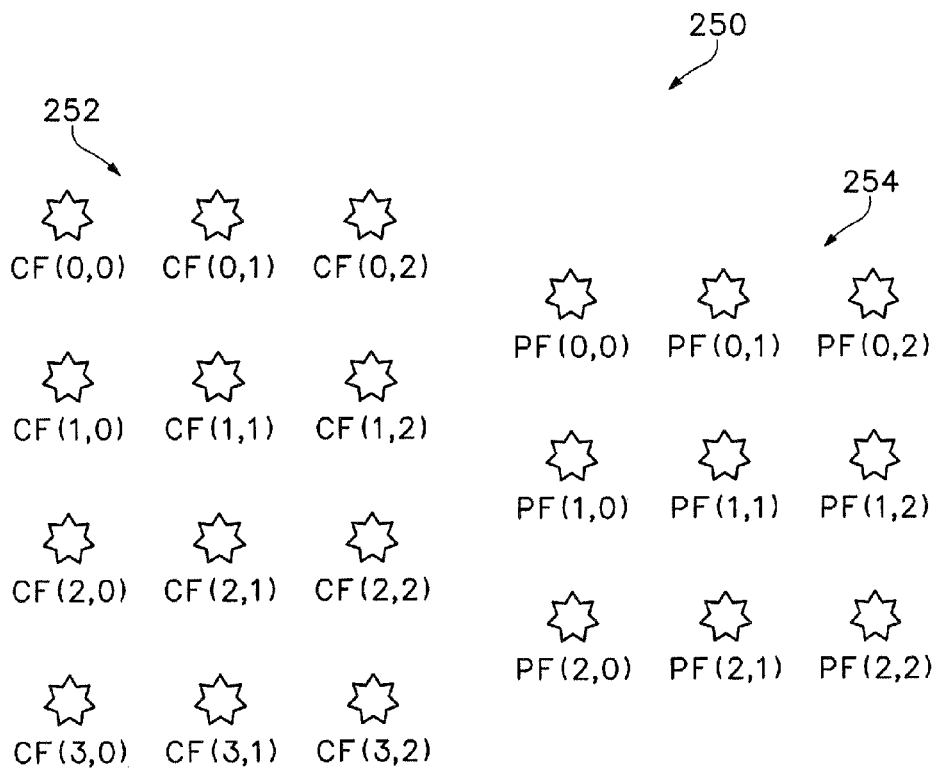
FIG. 2b is an illustration of the respective windows of the current field and the previous field mentioned in FIG. 4a showing the temporal difference between fields.

Referring to FIG. 2b, the decision window is illustrated generally by numeral 250. The decision window 250 demonstrates the temporal displacement between the current field pixels 252 and the previous field pixels 254. Typically the temporal displacement is one sixtieth of a second. Spatially, however, the columns of the current field and the previous field pixels are aligned, as illustrated in FIG. 2a.

Figure 3:
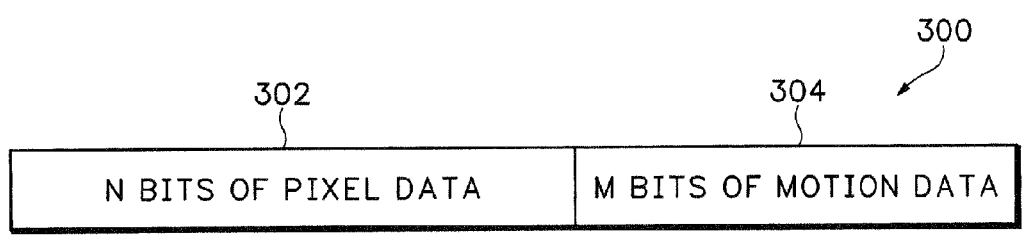
FIG. 3 is an illustration of the bit allocation used for pixel data storage and the associated Auxiliary Pixel Data information.

Referring to FIG. 3a, representation of how pixel information is stored is illustrated by numeral 300. A first portion of data 302 comprises general pixel information. Typically, for YUV422 the number of bits required for general pixel information is eight, four, and four for the Y, U, and V channels respectively.

A second portion of data 304 comprises information that is appended to the general pixel information. The appended information relates to motion and structure information, as will be determined by the MAVT algorithm. The appended information is also referred to as auxiliary pixel data. The auxiliary pixel data is used for determining if the pixel is part of:

i) An edge structure;
ii) A motion structure; or,
iii) A static pixel structure.

Table 1 is a sample list of the encoded information available in the auxiliary pixel data field.

| NAME | # BITS | DESCRIPTION |
| --- | --- | --- |
| Subtitle Information | 1 | Describes whether the pixel belongs to a subtitle. |
| Quantized motion Information | $N_1$ | Describes the amount of motion in a pixel for both unidirectional and bi-directional cases. It also indicates the duration a pixel has remained static. |
| Structure Type | $N_2$ | Describes the type of structure exhibited. A structure may be a textured region, a horizontal/vertical line, a flat region, a high variable region, and the like. |
| Structure Motion Information | $N_3$ | Describes the duration a structure remains static. |
| Noise | $N4_3$ | Type and severity of Noise. |
| ... | $N_n$ | |

Figure 4:
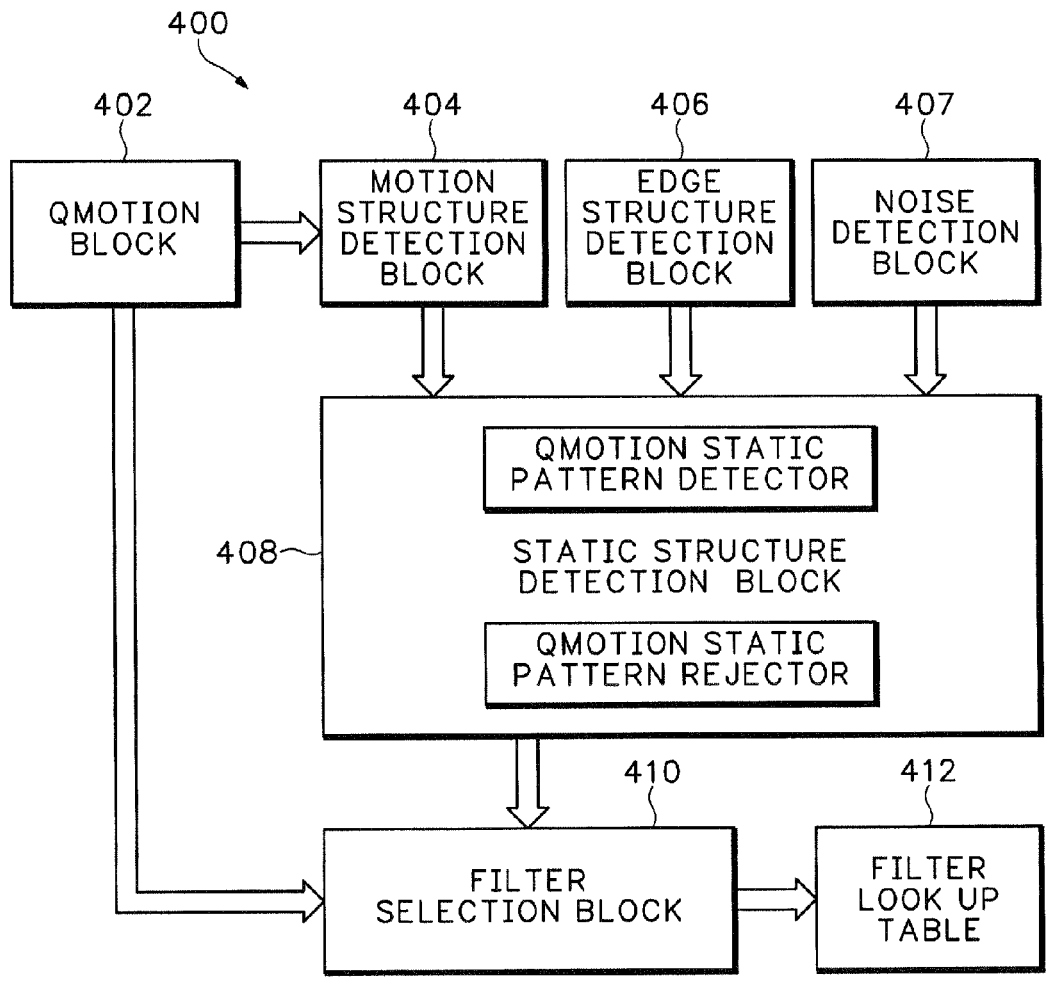
FIG. 4 is an illustration of the system block diagram of the primary logical block used in the Motion Adaptive Vertical Temporal Filter.

Referring to FIG. 4, a schematic system architecture of the MAVT filter is illustrated generally by numeral 400. The major components of the system comprise a quantizer 402, a motion structure detector 404, an edge structure detector 406, a static structure detector 408, a noise detector 407, a filter selector 410, and a filter look-up table 412. The quantizer 402 is coupled to the motion structure detector 404 and the filter selector 410. The motion structure detector 404 and the edge structure detector 406 are coupled to the static structure detector 408, which is also coupled to the filter selector 410. The filter selector 410 is coupled to the filter look-up table 412.

Quantizer

Figure 5:
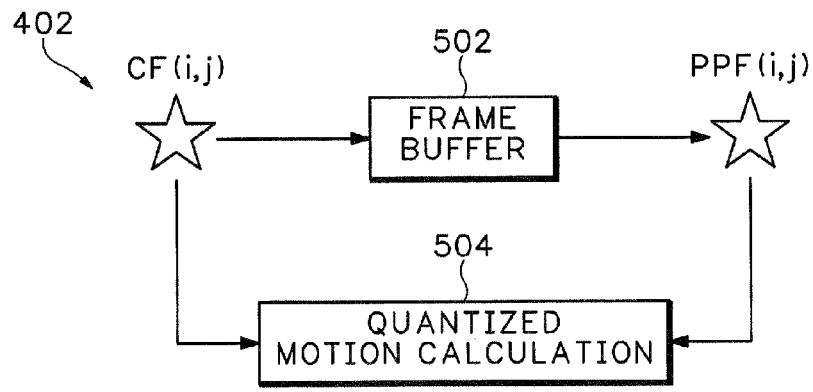
FIG. 5 is a schematic diagram of a quantizer.

Referring to FIG. 5, the quantizer 402 is illustrated in greater detail. The quantizer 402 comprises a frame buffer 502 and a calculator 504. The calculator 504 receives a CF input pixel CF(i,j) and a previous field (PPF) input pixel PPF(i,j). The PPF is the field immediately prior in time to the PF. The PPF pixel is retrieved from the frame buffer 502. The calculator 504 computes the absolute difference between the input pixels CF(i,j) and PPF(i,j). To achieve this function, at least two fields of pixel information are stored in the frame buffer 502.

If the magnitude of the difference CF(i,j)−PPF(i,j) exceeds a predefined programmable threshold, the pixel CF(i,j) is considered to be in motion. Otherwise, the pixel CF(i,j) is considered to be static.

In the present embodiment, the quantized motion information is generated using an "if-else" structure employing a number of programmable thresholds. Typically, a minimum of four thresholds is used. Table 2 below illustrates one configuration for programmable thresholds for quantized inter-frame motion levels.

TABLE 1

| Threshold Name | Number of Bits | Default Value |
|---|---|---|
| ALT_MOTIONTYPE_PULLDOWN STATIC | B1 | T1(0) |
| ALT_MOTIONTYPE_STATIC | B1 | T1(1) |
| ALT_MOTIONTYPE_SUBTITLE_EDGE | B1 | T1(2) |
| ALT_MOTIONTYPE_REGULAR | B1 | T1(3) |
| CURRENTLY UNUSED, RE-PROGRAMMABLE | B1 | T1(4) |
| CURRENTLY UNUSED, RE-PROGRAMMABLE | B1 | T1(5) |
| CURRENTLY UNUSED, RE-PROGRAMMABLE | B1 | T1(6) |
| CURRENTLY UNUSED, RE-PROGRAMMABLE | B1 | T1(7) |

B1 represents the number of bits used to represent the said thresholds and the default values. The thresholds are in ascending order and have a positive value. Typical values for T1(0) ... T1(3) are 16, 30, 35, and 50 respectively.

The designation ( ... )SUBTITLE EDGE in Table 2 and Table 3 below refers to a label used during the detection of film mode. Film mode detection relies on pattern detection in the received fields. For film mode detection, it is useful to detect subtitles because their presence can cause a pattern detector to incorrectly identify a film mode. Thus, if it is known when subtitles are present, the film mode detection can be enhanced.

However, the details of film detection are beyond the scope of the present invention. It will be apparent to a person skilled in the art that the present invention can be used in conjunction with film mode detection. Further information on film mode detection in an interlaced video signal is described in detail in a companion application entitled "A System And Method For Detecting A Non-Video Source in Video Signals."

An initial step for calculating the quantized motion value is to determine a plurality of intermediate quantized motion values. A first intermediate quantized motion value is referred to as IQMotion(i,j), where IQMotion(i,j)=ABS(CF(i,j)–PPF(i,j)). The first intermediate quantized motion value is a temporal comparison between two pixels in the same position. The pixels are in fields having the same polarity in adjacent frames. The term polarity refers to a field being either odd or even. Two even fields, for example, have the same polarity.

The next step is to find a minimum threshold T1(m) such that the intermediate quantized motion value IQMotion(i,j) is less than T1(m), where m ∈ {0 ... ITMAX-1}, and where ITMAX is the total number of thresholds. Pseudo code to achieve the quantization of IQMotion(i,j) is provided below.

```
delta_CF_PPF(i,j) = ABS(CF(i,j) – PPF(i,j))
if( delta_CF_PPF(i,j) <=
ALT_THRESHOLD_MOTION_PULLDOWN_STATIC)
{
    IQMotion(i,j) = MOTIONTYPE_PULLDOWN_STATIC
}
else if( delta_CF_PPF(i,j) <=
ALT_THRESHOLD_MOTIONTYPE_STATIC)
{
    IQMotion(i,j) = MOTIONTYPE_STATIC
}
else if( delta_CF_PPF(i,j) <=
ALT_MOTIONTYPE_SUBTITLE_EDGE)
```

-continued

```
{
    IQMotion(i,j) = MOTIONTYPE_SUBTITLE_EDGE
}
else if( delta_CF_PPF(i,j) <= ALT_MOTIONTYPE_REGULAR)
{
    IQMotion(i,j) = MOTIONTYPE_REGULAR
}
```

The thresholds are used to quantify the inter-frame difference on a per pixel basis. The depth of the if..else structure depends on the number of thresholds used to classify the type of the estimated motion.

Once the intermediate quantized motion value has been determined, a final quantized motion value FQMotion(i,j) is calculated. The final quantized motion value is a function of the intermediate quantized motion value IQMotion(i,j) as well as the quantized motion values for the previous field, P_QMotion(i,j).

The final quantized motion value FQMotion(i,j) examines the quantized motion information for pixel (i,j) in both the CF and the PF. For example, if the PF quantized motion value P_QMotion(i,j) indicates that the pixel has remained static for one field and the CF intermediate quantized value IQMotion (i,j) indicates that the CF pixel is also static, then the final quantized motion value FQMotion(i,j) indicates that the pixel has been static for two fields. This calculation determines the number of times a pixel has been static, and ensures that the CF quantized motion value FQMotion(i,j) propagates the historical information forward in time.

If the PF quantized motion value PF_QMotion(i,j) is not considered to be static, then no static pixel history can be confirmed. In this case, the final quantized motion value FQMotion(i,j) assumes the intermediate quantized value IQM(i,j).

Pseudo code for the final quantized motion value FQMotion(i,j) is as follows:

```
if(PF_QM(i,j)<= MOTIONTYPE_STATIC AND
IQM(i,j)<= MOTIONTYPE_STATIC)
{
    if(PF_QM(i,j) == MOTIONTYPE_STATIC)
    {
        FQM(i,j) MOTIONTYPE_STATIC2
    }
    else if(PF_QM(i,j) == MOTIONTYPE_STATIC2)
    {
        FQM(i,j) MOTIONTYPE_STATIC3
    }
    .
    .
    .
    else if(PF_QM(i,j) == MOTIONTYPE_STATIC(n))
    {
        FQM(i,j) = MOTIONTYPE_STATIC(n+1)
    }
else
{
    FQM(i,j) = IQM(i,j)
}
CF_QM(i,j) = FQM(i,j)
```

The final quantized motion value is enumerated by correlating a motion type with a numerical value. Therefore, for example, if it is determined that the motion type for the final quantized motion value is MOTIONTYPE_STATIC2, then the final quantized motion value is NV2. Table 4 illustrates a sample list of motion types and corresponding numerical values.

TABLE 4

| Motion Type | Number of Bits | Numerical Value |
|---|---|---|
| MOTIONTYPE_STATIC4 | B2 | NV0 |
| MOTIONTYPE_STATIC3 | B2 | NV1 |
| MOTIONTYPE_STATIC2 | B2 | NV2 |
| MOTIONTYPE_PULLDOWN_STATIC | B2 | NV3 |
| MOTIONTYPE_STATIC | B2 | NV4 |
| MOTIONTYPE_SUBTITLE_EDGE | B2 | NV5 |
| MOTIONTYPE_REGULAR | B2 | NV6 |
| MOTIONTYPE_HIGH | B2 | NV7 |

B2 represents the bit-size of the plurality of possible quantized motion values, which are represented by the programmable variables NV0 through to NV7.

It is possible to use the information as to how long a pixel has been static to dynamically change the nature of the MAVTF filter coefficients. That is, the larger the count the more likely the pixels in question are static. This condition does not imply that the pixels are truly absent of motion. However, inter-frame differences are useful indicators when combined with other measures. Together they help determine whether a pixel, or a group of pixels about the target pixel, is relatively static.

In the present embodiment, there are eight motion types, and therefore eight quantized motion values. The numerical values range from a low value to a higher value, such as from zero (0) to seven (7) for example. Since the largest numerical value is seven, a minimum of three (3) bits is used to represent the motion type. Therefore, B2=3.

A person skilled in the art will appreciate that the values and bit-sizes can be adjusted according to the specific requirements of the embodiment. Furthermore, the numerical values may be increased or decreased to account for noise in the source image.

Once the quantized motion pixel data has been determined, it is fed to the motion structure Detector (MSD), the edge structure detector (ESD), and the static structure detector (SSD).

Motion Structure Detector

Figure 6A:
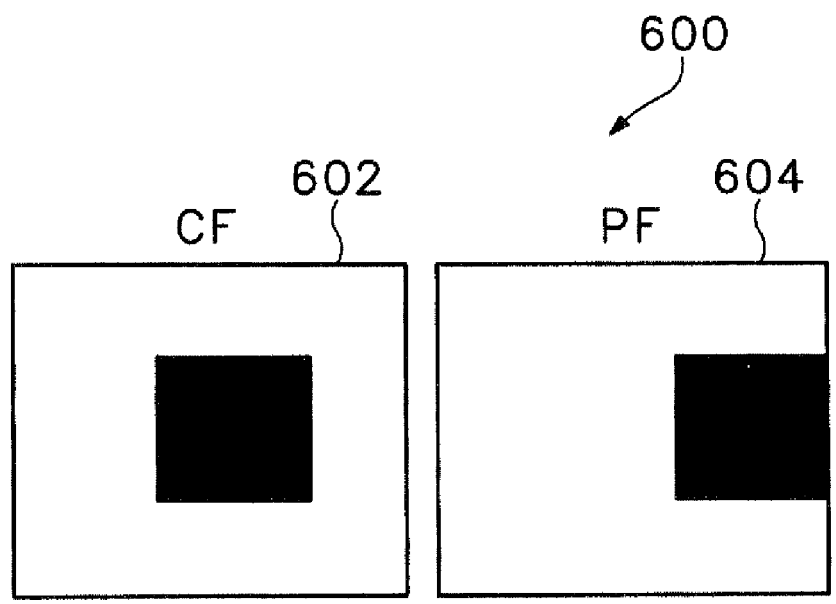
FIG. 6 is an illustration of a feathering artifact.
Figure 6B:
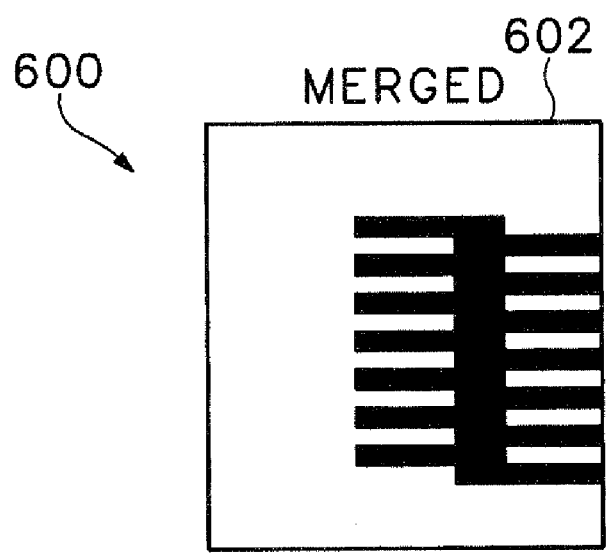

The motion structure detector (MSD) identifies pixels that exhibit feathering characteristics. Typically, a feathering artifact occurs when there is significant inter-field motion. Referring to FIG. 6, an example of feathering is illustrated. FIG. 6a shows the effects of an object in motion, represented generally by numeral 600, in an interlaced system. In the current field 602, the object appears at the center of the screen. In the previous Field 604, the object appears at the right of the screen. Lines in the CF are horizontally offset from lines in the PF by the distance the block travels in one sixtieth of a second. Referring to FIG. 6b, if the current field and the previous field were to be meshed together, then the result would be an object which overlaps in the middle, but is only displayed on alternating even and odd lines towards the edge of the object.

Therefore, the reconstructed block comprises a series of offset lines, which is referred to as feathering.

One way to detect feathering is to calculate the signed differences between adjacent pixels, that is, pixel differences between the CF and the PF. The differences are then compared with signed thresholds for determining whether structured motion is present between the pixels in the CF and the PF.

Motion structure determination examines the decision window for patterns that indicate inter-field movement. Motion can be inferred if a feathering artifact is present. Feathering occurs due to the relative movement of an object between fields within the image scene. As the object moves, the position of the object is different in the current field (CF) and previous field (PF).

If an object is in motion, it will almost certainly be accompanied by feathering. Feathering alone, however, does not necessarily indicate that the object is in motion. Further, it should be noted that feathering can also occur when there is a vertical component to inter-field motion. Yet, further, feathering as described above may seem to occur when there is no inter-field motion present. It may simply be the result of an unusual static pattern.

The motion structure detector operates independently in all three channels (Y, U, V) of video data. Alternately, in the case of RGB video, it operates independently in the R, G and B colour channels. If motion structure is found in any of the channels, the corresponding pixel is tagged as having feathering present, and a Boolean variable tag, FEATHERING_MOTION_PRESENT, is set to true. The FEATHERING_MOTION_PRESENT tag is encoded into the auxiliary pixel data associated with each pixel. If the tag indicates feathering, it inhibits the use of a filter that is best suited for a static image scene (i.e., little or no inter-field motion) for calculating the target pixel. Rather, the selection of a high motion vertical temporal filter is preferred.

Several methods for detecting feathering are common in the art, see for example U.S. Pat. No. 6,201,577 and U.S. Pat. No. 5,625,421. Such implementations typically consist of a pattern detector looking for a purely vertical sequence of alternating "High-Low-High . . . " pixel values in the current and previous fields, respectively. However, use of these methods restricts feathering detection in the purely vertical direction.

Figure 7:
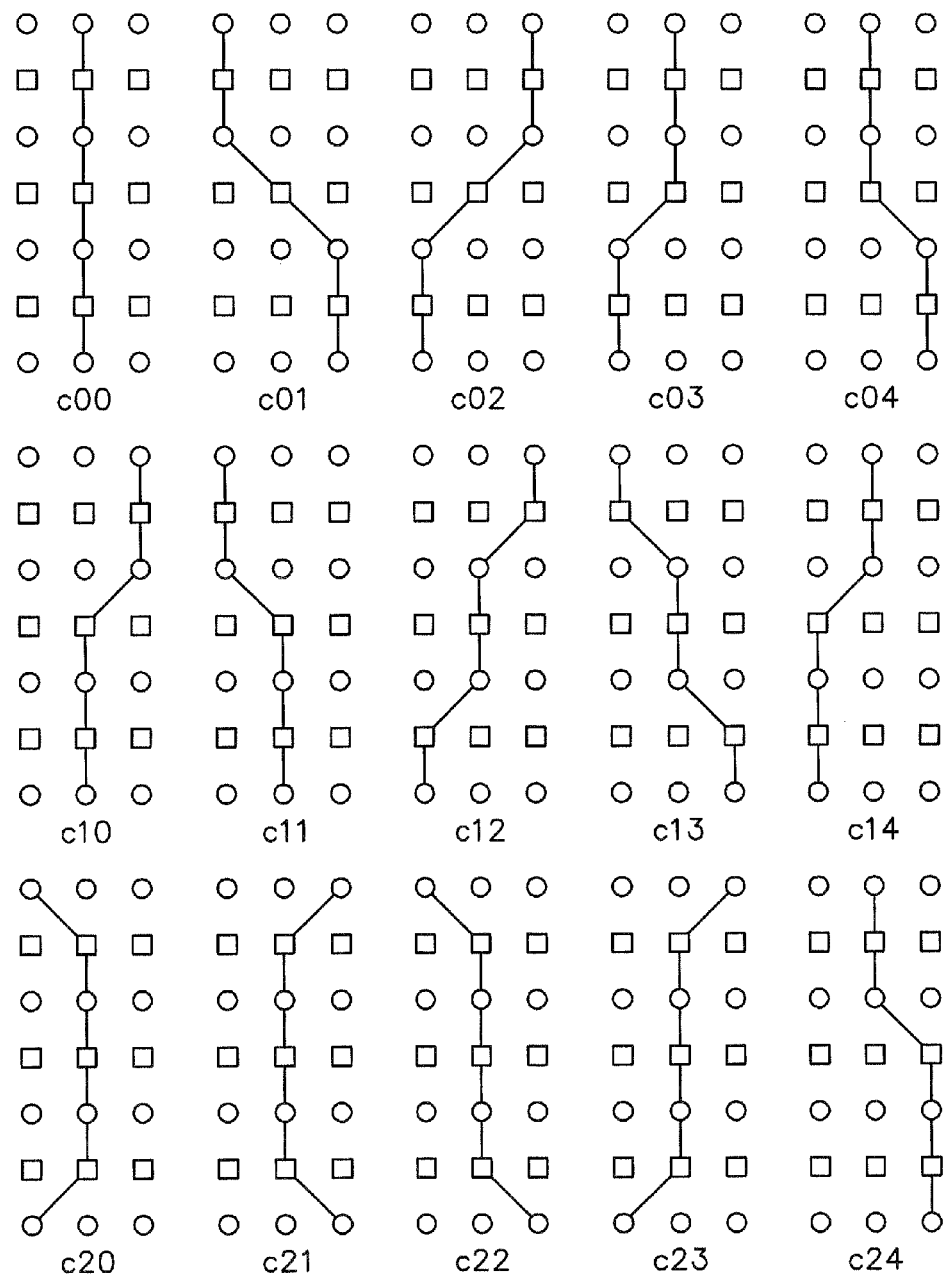
FIG. 7 is an illustration of some of the contouring configurations used to detect feathering and to effect directional interpolation during format conversion.

In the present embodiment, a method of feathering detection uses a series of programmable thresholds and examines a directional component to the feathering artifact. This allows a feathering discriminator to be more sensitive to objects that have an arbitrary shape. Referring to FIG. 7, a plurality of filter tap configurations is shown. The filter tap configurations are used for detecting the feathering artifact. The use of various configurations for feathering detection is referred to as directional feathering, since feathering detection is not only performed in the purely vertical direction.

Figure 8:
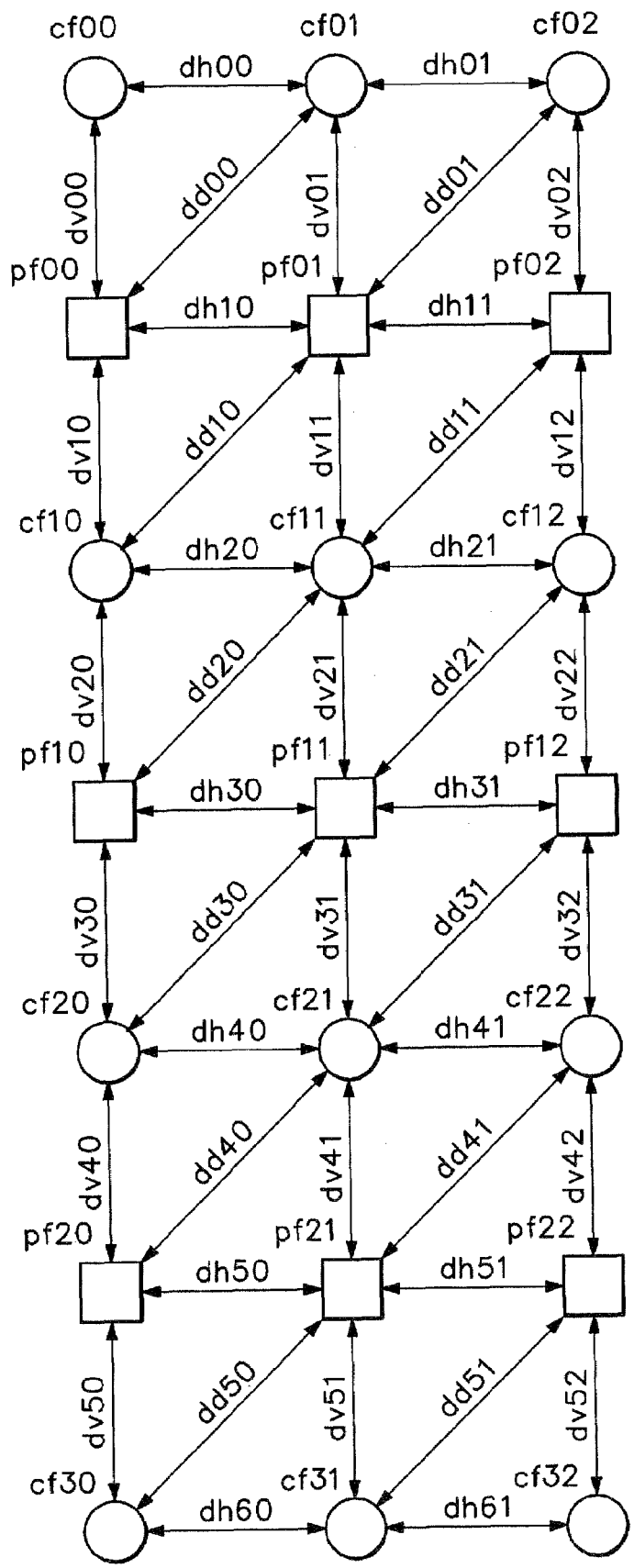
FIG. 8 is an illustration of the seven by three window of current field and previous field pixel data and associated edges.

The following example illustrates how a feathering detector can be defined. Referring to FIG. 8, a vertical distance DV between two pixels is defined as the difference between a CF pixel and a PF pixel in adjacent rows, but in the same column. Referring again to FIG. 7, a first contour, C00 can be separated into a plurality of differences as follows:

$$DV01 = CF(0,1) - PF(0,1)$$

$$DV11 = PF(0,1) - CF(1,1)$$

$$DV21 = CF(1,1) - PF(1,1)$$

$$DV31 = PF(1,1) - CF(2,1)$$

$$DV41 = CF(2,1) - PF(2,1)$$

$$DV51 = PF(2,1) - CF(3,1)$$

For the above differences, a set of predefined positively valued thresholds, TA={T1, T2, T3, T4, T5}, is defined. The thresholds are programmable. For the first contour C00, feathering exists if the following equation is satisfied:

FeatheringC00=($DV01 \leftarrow T1$ AND $DV11 > T2$ AND
$DV21 \leftarrow T3$ AND $DV31 > T4$ AND $DV41 \leftarrow T5$
AND $DV51 > T6$) OR ($DV01 > T1$ AND $DV11 \leftarrow T2$
AND $DV21 > T3$ AND $DV31 \leftarrow T4$ AND $DV41 > T5$
AND $DV51 \leftarrow T6$)  Equation 2

Figure 9A:
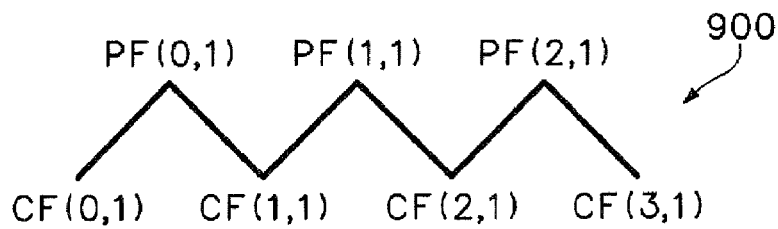
FIGS. 9a to d are illustrations of a sawtooth waveform resulting from a feathering artifact.

Referring to FIG. 9a, a pixel difference pattern indicating feathering is illustrated generally by numeral 900. Such a feathering pattern results from the motion of the square illustrated in FIG. 6. Configuration C00 is selected and the left edge of the meshed square is examined. The difference DV01 between CF(0,1) and PF(0,1) is a positive number. The difference DV11 between PF(0,1) and CF(1,1) is a negative number. This pattern repeats for all the differences calculated, resulting in a saw-tooth waveform as illustrated. The differences are compared with the thresholds in accordance with equation 2.

In this particular example, the feathering will cause the second portion of the equation to be true. Therefore, the Boolean variable, Feathering C00, is set to true, and feathering is present between two consecutive fields of interlaced video.

Figure 9B:
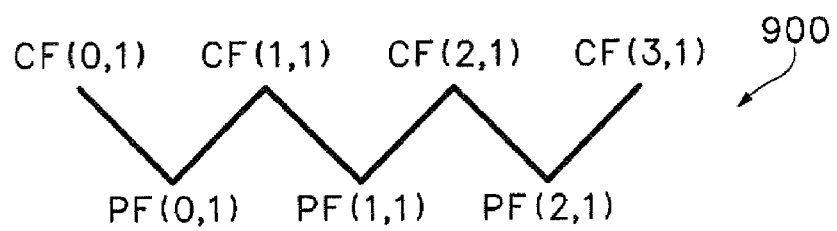

Alternately, the difference DV01 may be a negative number and the difference DV11 a positive number. If this pattern repeats, a saw-tooth waveform as illustrated in FIG. 9b will be generated. Note that the waveform is inverted from the example illustrated in FIG. 9a. As in the previous example, the differences are compared with the threshold in accordance with equation 2. However, in the present example, the feathering will cause the first portion of the equation to be true. Therefore, the Boolean variable, FeatheringC00, is set to true, and feathering is present in two consecutive fields of interlaced video.

Figure 9C:
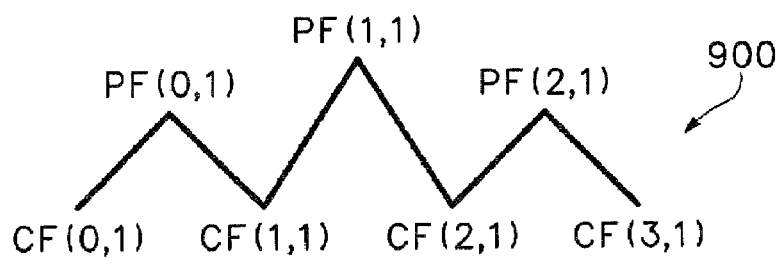
Figure 9D:
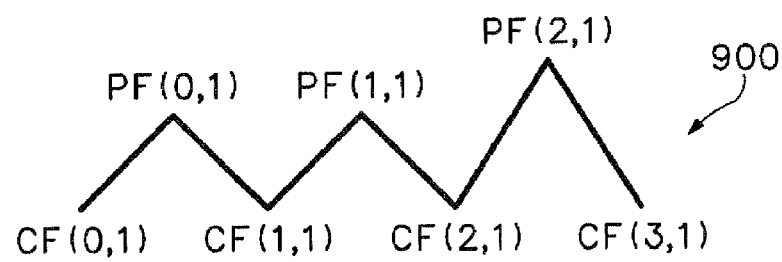

Furthermore, the thresholds do not have to have the same magnitude as illustrated in FIGS. 9a and b. The thresholds may have non-uniform magnitudes as illustrated in FIGS. 9c and d for more accurately identifying feathering patterns along a periphery of an arbitrary shape. Other threshold patterns will become apparent to a person skilled in the art.

Using the programmable thresholds in the threshold set TA for the decision window allows identification, with greater precision, of a feathering artifact that accompanies objects whose perimeter is not necessarily vertically aligned. That is, feathering can be more readily detected for objects in motion that are arbitrary in shape. In contrast, a stricter measure of feathering, which does not use multiple programmable thresholds and always looks for feathering in the purely vertical direction, is less effective for objects of arbitrary shape.

For example, a square object and a round object will not exhibit the feathering artifact to the same degree in the vertical direction at any given time. This is true even if both objects have undergone the same inter-field horizontal motion. However, if the round object is measured along its periphery, it will exhibit similar levels of feathering to that of the square object.

The multiple threshold approach coupled with directional feathering detection allows the feathering artifact to be detected more easily around the periphery of an arbitrarily shape object. Feathering indicators are also defined for indicating feathering in accordance with each contour as depicted in FIG. 2. Therefore, feathering can be detected for relatively arbitrary objects that exhibit inter-field motion. Other measures and indicators of feathering can be likewise constructed for each of remaining contours of FIG. 2. The detection of feathering can easily be extended to contours that work on a larger window as will be appreciated by a person skilled in the art.

Moreover, in addition to directional feathering, the feathering artifact can be more reliably identified when it is exhibited by a group of pixels. Therefore, it is preferable that the feathering artifact is not deemed present unless a group of adjacent pixels exhibits the feathering artifact. For example, for a group length (GL) of pixels set to three, three consecutive pixels must satisfy the pixel-based feathering artifact condition as defined by Equation 2. Therefore, the first two adjacent pixels in the group do not result in an alteration of a feathering accumulation signal. The third pixel increments the feathering accumulation signal, since a group of consecutive pixels equal to the GL has occurred. Typically, the feathering accumulation signal is used to indicate the amount of feathering that is aggregated over the entirety of consecutive current and previous fields.

Neither the fourth nor the fifth pixel will change the feathering accumulation signal, but the sixth consecutive adjacent pixel will increment the feathering accumulation signal. Because the remaining pixels, that is, the seventh and eighth pixels, do not form a group of pixels equal to the GL, they do not contribute to the feathering accumulation signal. Therefore, the feathering accumulation signal is incremented twice because two complete sets of consecutive pixels equal to GL satisfy the pixel-based feathering artifact condition. The number of times the feathering accumulation signal is altered for a cluster of consecutive pixels that exhibit the feathering artifact (CP) is defined as follows:

No. of Alterations=CP modulus GL  Equation 3

The modulus operation returns the greatest whole number of GL groups in CP.

Performing feathering detection based on a cluster of pixels provides further noise immunity as well as some protection against false feathering indicators that may occur when encountering structures in the image scene such as vertical edges. The group length is generally programmable and may vary from a length of one to several dozen. Preferably, the value of GL is three.

Furthermore, another advantage of the grouping method of feathering is that it allows one to estimate the amount of inter-frame motion (although not necessarily the direction of motion) of an object by using several Group Length feathering values at the same time. For example, it is possible to have several counters tracking group lengths of 1, 3, and 5. If the counter tracking group length 1 indicates feathering, but the other counters do not, it is likely that the image scene has little motion and high noise. If both the counters tracking group lengths 1 and 3 indicate feathering, but the third counter does not, it is likely that there is some motion and some noise. If all three counters indicate feathering, then it is likely that there is motion in the image scene.

Feathering as described above is also useful for film mode detection. Usually to detect film mode, a pull-down signal is generated which may rely on a feathering indicator, or signal. The signal is referred to as the AdjDiff signal and it is generated by aggregating the weighted sum of the pixels indicating feathering. By accumulating the AdjDiff signal according to consecutive groups of N pixels, an improved AdjDiff signal is attainable resulting in improved film mode detection.

Edge Structure Detector

Figure 10A:
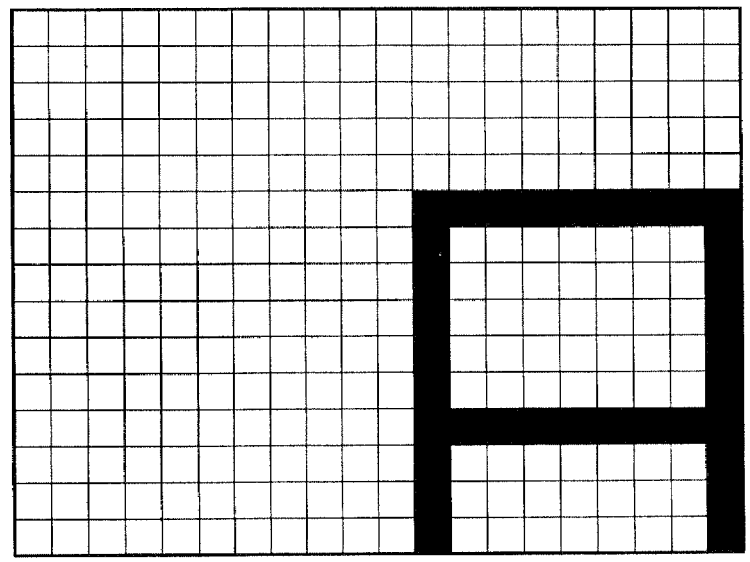
FIG. 10a is an illustration of a letter as it can appear on a pixilated image grid.
Figure 10B:
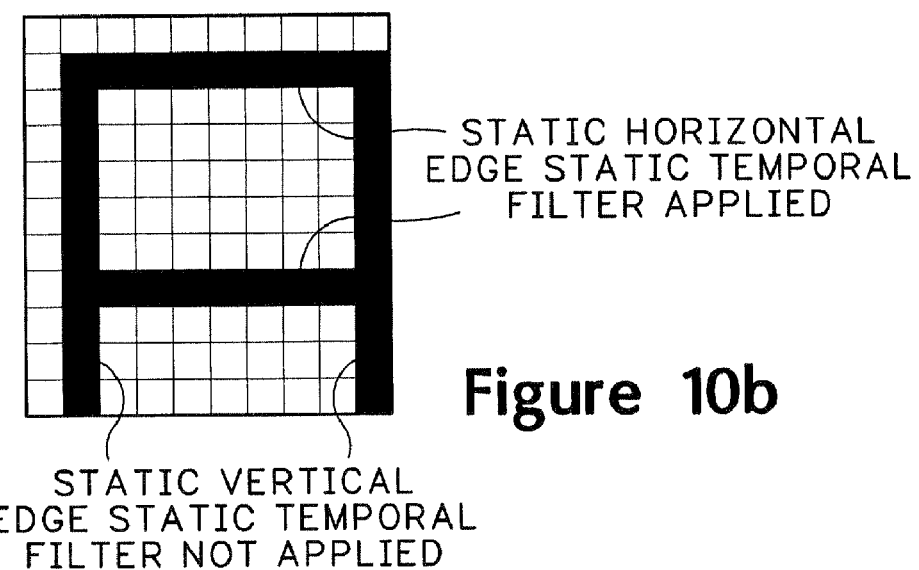
FIG. 10b is an illustration of a letter highlighting the important structural regions.

The edge structure detector (ESD) 406 identifies vertical edges in the pixel data in the decision window, and incorporates this information into the auxiliary pixel data field. It is useful to be able to detect and act upon spatial and temporal edges because they are usually the most important and visually significant elements in the image scene. Referring to FIGS. 10*a* and 10*b*, a top portion of the letter "A" is illustrated generally by numeral 1000. The letter "A" is illustrated as an example of a visually significant vertical edge.

Information provided by the quantizer 402 is used for predicting edges in the decision window. The second, third, and fourth intermediate quantized motion values are referred to as IQ2Motion(i,j), IQ3Motion(i,j), and IQ4Motion(i,j) where IQ2Motion(i,j)=ABS(CF(i,j)−PF(i,j)), IQ3Motion(i,j)=ABS(CF(i,j)−PF(i−1,j)), and IQ4Motion(i,j) ABS(CF(i,j)−PF(i+1,j)). The second, third, and fourth intermediate quantized motion values are a spatio-temporal comparison between two pixels in adjacent fields of different polarity. The comparison is spatial because the pixels are vertically offset due to the nature of interlacing and temporal because the PF and CF fields are displaced in time.

The IQ3Motion calculation is based upon the difference between the CF(i,j) and the PF(i−1,j) pixels. The IQ4Motion calculation is based on the difference between the CF(i,j) and the PF(i+1,j) pixels. When the CF is odd, the CF pixels are spatially above the PF pixels and IQ2 and IQ3 are required. When the CF is even, the CF pixels are spatially below the PF pixels and IQ2 and IQ4 are required. Here it is assumed the odd field is the field that contains the first or uppermost line of image data in the image frame. The definition is arbitrary. The logic for performing these calculations is the same, and because they are mutually exclusive, the same hardware is used to perform them.

Table 3 below illustrates a configuration for programmable thresholds for quantized inter-field motion levels.

TABLE 3

| Threshold Name | Number of Bits | Default Value |
| --- | --- | --- |
| ADJ_MOTIONTYPE_PULLDOWN_STATIC | B1 | T2(0) |
| ADJ_MOTIONTYPE_STATIC | B1 | T2(1) |
| ADJ_MOTIONTYPE_SUBTITLE_EDGE | B1 | T2(2) |
| ADJ_MOTIONTYPE_REGULAR | B1 | T2(3) |
| CURRENTLY UNUSED, RE-PROGRAMMABLE | B1 | T2(4) |
| CURRENTLY UNUSED, RE-PROGRAMMABLE | B1 | T2(5) |
| CURRENTLY UNUSED, RE-PROGRAMMABLE | B1 | T2(6) |
| CURRENTLY UNUSED, RE-PROGRAMMABLE | B1 | T2(7) |

A minimum threshold T2(n) is found such that the second intermediate value IQ2Motion(i,j) is less than T2(n), where n ∈ {0 . . . ITMAX−1}. A minimum threshold T2(o) is found such that the third intermediate value IQ3Motion(i,j) is less than T2(o), where o ∈ {0 . . . ITMAX−1}. Further, a minimum threshold T2(p) is found such that the fourth intermediate value IQ4Motion(i,j) is less than T2(p), where p ∈ {0 . . . ITMAX−1}. Typical values for T2(0) . . . T2(3) are 16, 30, 35, and 50 respectively. Pseudo code for IQ2Motion(i,j) is as follows:

```
delta_CF_PF = ABS( CF(i,j) PF(i,j))
//INTERMEDIATE CALCULATION
if( delta_CF_PF <= ADJ_THRESHOLD_MOTION_STATIC)
{
    IQ2Motion = ADJ_MOTIONTYPE_STATIC
}
else if( delta_CF_PF>=ADJ_THRESHOLD_MOTION_EDGE)
{
    IQ2Motion=ADJ_MOTIONTYPE_EDGE
}
```

-continued

```
else
{
    IQ2Motion=NIL
}
//FINAL CALCULATION
if(IQ2Motion == ADJ_MOTIONTYPE_STATIC)
{
    if(P_Q2Motion(i,j) == ADJ_MOTIONTYPE_STATIC)
    {
        Q2Motion(i,j) = ADJ_MOTIONTYPE_STATIC2
    }
    else if( P_Q2Motion(i,j) == ADJ_MOTIONTYPE_STATIC2)
    {
        Q2Motion(i,j) = ADJ_MOTIONTYPE_STATIC3
    }
    else if(P_Q2Motion(i,j) == ADJ_MOTIONTYPE_STATIC3)
    {
        Q2Motion(i,j) = ADJ_MOTIONTYPE_STATIC4
    }
    else
    {
        Q2Motion(i,j) = ADJ_MOTIONTYPE_STATIC
    }
}
else if(IQ2Motion == ADJ_MOTIONTYPE_EDGE)
{
    if(P_Q2Motion(i,j) == ADJ_MOTIONTYPE_EDGE)
    {
        Q2Motion(i,j) = ADJ_MOTIONTYPE_EDGE2
    }
    else if(P_Q2Motion == ADJ_MOTIONTYPE_EDGE2)
    {
        Q2Motion(i,j) = ADJ_MOTIONTYPE_EDGE3
    }
    else if(P_Q2Motion == ADJ_MOTIONTYPE_EDGE3)
    {
        Q2Motion(i,j) = ADJ_MOTIONTYPE_EDGE4
    }
    else
    {
        Q2Motion(i,j) = ADJ_MOTIONTYPE_EDGE
    }
}
else
{
    Q2Motion(i,j) = NIL
}
```

In the above pseudo code, P_Q2Motion refers to a previous final second motion value. The term Q2Motion refers to the final value for the intermediate value IQ2Motion. Similar code is used for IQ3Motion(i,j) and IQ4Motion(i,j). It can be seen from the pseudo code that the persistence of an edge is tracked similarly to the persistence of a static pixel. This provides more robust edge detection since an edge history is maintained.

The second, third, and fourth intermediate values are useful for predicting edges in the image. These values are used in conjunction with additional rigid edge detection, which is described below.

The ESD examines spatial differences between pixels in the CF, spatial differences in the PF field, and spatio-temporal differences between the CF and the PF. The ESD performs edge and level determination of the differences and provides Boolean information for indicating whether an edge structure or a level structure is present within the decision window.

Figure 11A:
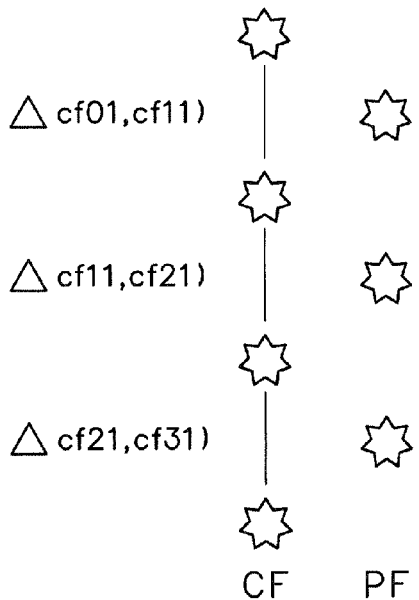
FIG. 11 is an illustration showing different scenarios used by the Edge Structure Detector.
Figure 11B:
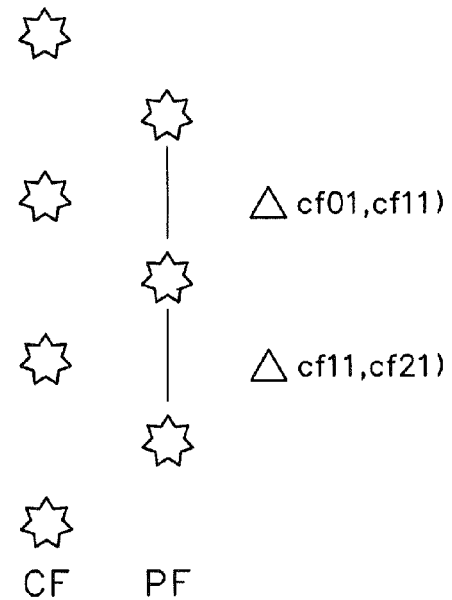
Figure 11C:
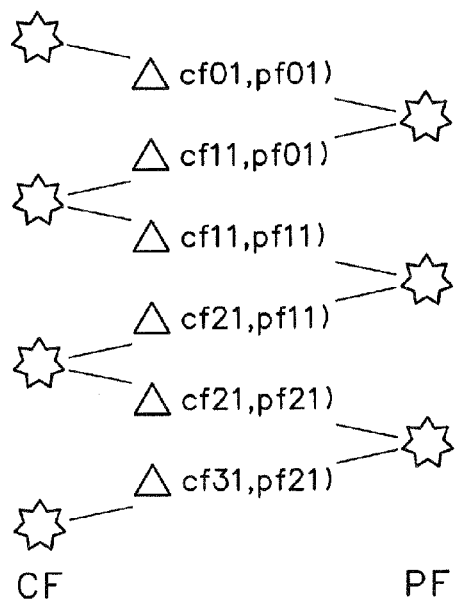

A majority of edges of interest are determined by pixels in the CF and PF in a vertical column. Referring to FIGS. 11*a*, 11*b* and 11*c* the differences between the CF pixels, the differences between the PF pixels, and the pair wise differences between the CF pixels and the PF pixels, are illustrated respectively. These differences are compared against a series of programmable thresholds to determine whether a level or an edge exists between the pixels. An example of level and edge calculations is as follows:

Example of a LEVEL ("FLATNESS")

```
if(ABS( cf01 – cf11) <= threshold_cfcf_level)
{
    level_cfcf_01_11 = true
}
else
{
    level_cfcf_01_11 = false
}
```

Example of an EDGE

```
if( ABS( cf01 – cf11) >= threshold_cfcf_Edge )
{
    edge_cfcf_01_11 = true
}
else
{
    edge_cfcf_01_11 = false
}
```

The level and edge comparisons are performed for all of the vertical differences in a desired column, resulting in a series of primitive Boolean values, listed in Table 5 below.

TABLE 5

| Edge Booleans | Level Booleans |
|---|---|
| edge_cfcf_01_11 | level_cfcf_01_11 |
| edge_cfcf_11_21 | level_cfcf_11_21 |
| edge_cfcf_21_31 | level_cfcf_21_31 |
| edge_pfpf_01_11 | level_pfpf_01_11 |
| edge_pfpf_11_21 | level_pfpf_11_21 |
| edge_cfpf_01_01 | level_cfpf_01_01 |
| edge_cfpf_11_01 | level_cfpf_11_01 |
| edge_cfpf_11_11 | level_cfpf_11_11 |
| edge_cfpf_21_11 | level_cfpf_21_11 |
| edge_cfpf_21_21 | level_cfpf_21_21 |
| edge_cfpf_31_31 | level_cfpf_31_31 |

The Boolean values are referred to as primitive because they indicate whether a simple edge lies between two pixels. They do not, in isolation, signal the presence of more complicated and significant structures such as multiple connected edges. However, the primitives can be combined to form complicated vertical edge types.

Figure 11D:
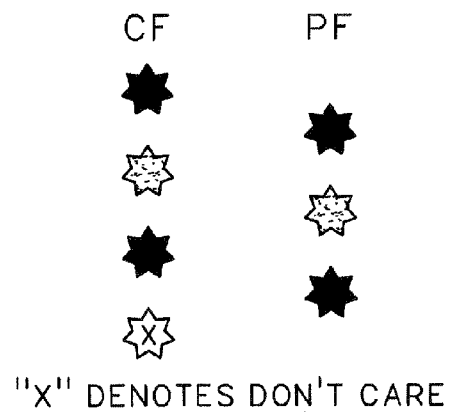
Figure 12A:
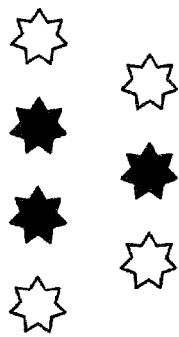
FIG. 12 is an illustration of various QMotion patterns used by the primary decision block.
Figure 12B:
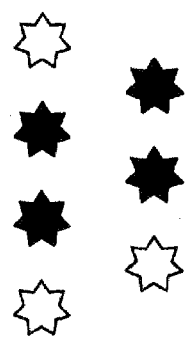
Figure 12C:
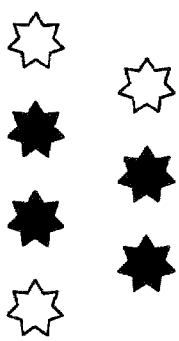
Figure 12D:
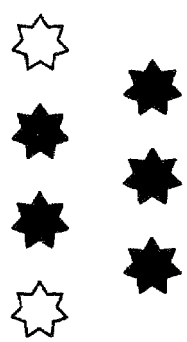
Figure 12E:
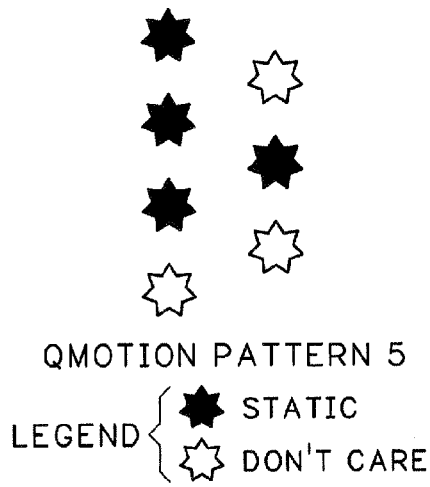
Figure 12F:
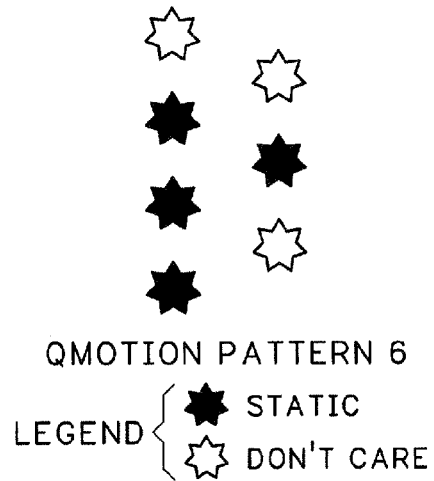

An example of a vertical edge is illustrated in FIG. 11d. The vertical edge spans the CF and the PF pixel information in positions CF(1,1) and PF(1,1). This edge is calculated by grouping the Boolean level and edge information such that edges are found between CF(1,1) and its surrounding pixels, as well as between PF(1,1) and its surrounding pixels. There is also a level between the CF(1,1) and the PF(1,1) pixels. The edge in FIG. 11d is defined as follows:

Edge=edge_cfcf_01_11 AND edge_cfcf_11_21 AND edge_pfpf_01_11 AND edge_pfpf_11_21 AND level_cfpf_11_11

The example above illustrates one possible orientation for a vertical edge. Clearly, many more edge patterns can be determined by combining the Boolean variables as listed in Table 5 above, as will be apparent to a person skilled in the art. The edge and level patterns used to determine a specific edge or level type are generally programmable. Table 6 lists some of the types of enumerated edge and level structures used for edge detection, Each of these enumerated types is determined as a result of a Boolean expression that evaluates the presence of edges in the decision window similar to the edge determined above. In this way, it is possible to have many different types of Edge and Level configurations as indicated by the entries in Table 6.

TABLE 6

Enumeration of some Edge and Level types as determined by the ESDB.

| Edge Type | Level Type |
|---|---|
| EDGE_T0 | LEVEL_T0 |
| EDGE_T1 | LEVEL_T1 |
| EDGE_T2 | LEVEL_T2 |
| EDGE_T3 | LEVEL_T3 |
| EDGE_T4 | LEVEL_T4 |
| EDGE_T5 | LEVEL_T5 |
| EDGE_T6 | LEVEL_T6 |

An alternate method to using the second, third and fourth intermediate values for predicting spatio-temporal edges is described below. Referring again to FIG. 8, a sample interlaced pixel grid is illustrated generally by numeral 800. Horizontal differences between pixels are referred to as DHij, vertical differences between pixels are referred to as DVij, and diagonal differences between pixels are referred to as DDij. As an example, differences DV11 and DV21 are the differences between CF(1,1) and PF(0,1), and CF(1,1) and PF(1,1) respectively. Both DV11 and DV21 are functions of time. This is indicated by denoting the differences as DV11($t$) and DV21($t$). It is then possible to determine the quantities:

$$DV11(\Delta t)=DV11(t)-DV11(t-1)$$

$$DV21(\Delta t)=DV21(t)-DV21(t-1).$$

DV11($\Delta t$) and DV21($\Delta t$) represent the difference between a respective current edge and a previous edge through time. The edge is determined by:

isUpperTemporalEdgeStable=
   ABS(DV11($\Delta t$))<THRESHOLD_EDGE_UPPER
isLowerTemporalEdgeStable=
   ABS(DV21($\Delta t$))<THRESHOLD_EDGE_LOWER The values THRESHOLD_EDGE_UPPER and THRESHOLD_EDGE_LOWER are positive programmable thresholds. The ABSO function is the absolute value operator. For generating bi-directional information, both of these thresholds are positive and nonzero. For generating unidirectional temporal edge information, one of the thresholds may be set to zero.

These expressions measure whether or not there has been a change in the temporal edge between the CF and the PF between times t and t−1. The next step is to associate a count value with the upper edge that keeps track of the number of consecutive instances that the isUpperTemporalEdgeStable was asserted (TRUE), and similarly, a count value that keeps track of the number of consecutive instances that a lower edge was stable. The count values are stored in the Auxiliary Pixel Data. Obviously, once either Boolean expression is FALSE, the respective counter is cleared and the counting process begins anew.

Note that in general the edge will be computed long enough in advance, so that it is available for decision making and processing.

Furthermore, in addition to the use of the inter-frame differences, the inter-field differences are also computed and the longevity of the edge is determined. Using this information, it is possible to keep track of the spatio-temporal edges that have persisted for several fields. This is an important and complementary indicator that can be used to gage the level of inter-field motion. The longevity of the edge is stored with the auxiliary pixel information and is incremented similarly to incrementing the static quantized motion data.

The Noise Detector

Noise detectors are common in the art. The noise detector implemented in the present invention may be either a standard or a proprietary noise detector. The noise detector contributes to the filtering of the current and previous field by adjusting for an amount of noise detected therein. For example, if the signal to noise ratio is low, that is a high level of noise is detected in a region of the image, a soft filter is used. Similarly, if a medium level of noise is detected relative to an image region, a nominal filter is used, and if a low level of noise is detected relative to the image region, a sharp filter is used. Thus, the noise is adaptively de-emphasized in accordance with local image statistics.

The Static Structure Detector

The Static Structure Detector (SSD) uses information from the ESD, in conjunction with information produced by the quantizer and the MSD. The Static Structure Detector (SSD) determines whether a pixel is static. In order to select the appropriate static filter, the SSD tests a number of criteria that need to be satisfied. These criteria include:

1. vertical edge criteria;
2. quantized motion patterns criteria; and
3. disqualifying motion patterns criteria.

As previously stated, the term "static" refers to the fact that there is no significant inter-field motion between the CF and the PF. Preferably, only specific regions in the image scene where vertical edges (as indicated by the ESD) are present are considered candidates for applying a static vertical temporal (VT) filter. The static VT filter is one that is generally programmable and treats the underlying pixels as if they were drawn from the same image scene. This suggests, at one extreme, that the VT filter loses its temporal component and collapses to a progressive filter. Thereby the PF pixels are promoted in the static region to be effectively temporally and spatially equal counterparts to the CF pixel.

The quantized motion data is used to assist in identifying static pixels, or it may be used to reject non-static pixels. The SSD has two primary components responsible for accepting or rejecting potential static pixel candidates. These components are a quantized motion static pattern detector and a quantized motion static pattern rejecter.

Static pixel patterns are groups of quantized motion data that exhibit predefined characteristics for being static. The criterion for a static pixel is programmable. This criterion is a programmable threshold that defines how many fields (of interlaced video) the content of a pixel must remain similar before it becomes a candidate for consideration in a static pixel pattern. For example, the static threshold is selected to be four. Therefore, the quantized motion values associated with a pixel must have been static for at least four consecutive frames. (This level is referred to as "STATIC4").

However, use of only the quantized motion information is typically insufficient for a pixel to be considered static. It is preferable that the quantized motion is combined with the vertical edge information for arriving at a conclusion.

Examples of quantized motion patterns are illustrated in FIGS. 12a to 12f. It is evident from these diagrams that the reference pixels (CF(1,1), CF(2,1) and PF(1,1)) satisfy the STATIC4 condition for each of the quantized motion patterns. This is required because these three pixels are the main contributors to VT Filtering. Examining the quantized motion pattern of FIG. 12a, the orientation of pixels can be calculated as follows:

$$\text{isQMotion\_Pattern\_1} = (\text{QMotion\_CF}(1,1) <= \text{MOTIONTYPE\_STATIC4})$$
$$\text{AND } (\text{QMotion\_CF}(2,1) <= \text{MOTIONTYPE\_STATIC4})$$
$$\text{AND } (\text{QMotion\_PF}(1,1) <= \text{MOTIONTYPE\_STATIC4}) \quad \text{Equation 1}$$

In addition to classifying the degree of motion on a per pixel basis, and aggregating the time dependent behavior of the pixel motion, structural information in both the current and previous fields such as lines and edges are combined for determining the appropriate filter. In order for the time aggregated motion pixel information to work effectively, rules are implemented that examine the aggregated pixel motion information in a neighborhood about the target pixel. The combined effect of spatial structure, time aggregated motion information, and motion structure results in a more effective means of deinterlacing.

In the present embodiment, the necessary and sufficient conditions for a pixel to be determined to be static include:

i) the pixel being part of an spatial edge;
ii) the inter-field edge has persisted in the same spatial location for at least N consecutive fields, where N is a programmable threshold.
iii) the inter-frame motion associated with the pixel being below the threshold indicating that it is static;
iv) the inter-frame motion associated with the pixel is satisfied for at least M consecutive previous fields, where M is a programmable threshold; and
v) a lack of the interlaced feathering artifact in the neighborhood about the target pixel.

The static pixel patterns are similar to the vertical edges previously defined. However, instead of operating on the image data directly (referred to as the Image Space), the SSD uses the quantized motion data (referred to as the Motion Space) to make decisions. Typically, vertical edges are identified in the upper, middle or lower regions of the pixel window.

Figure 13A:
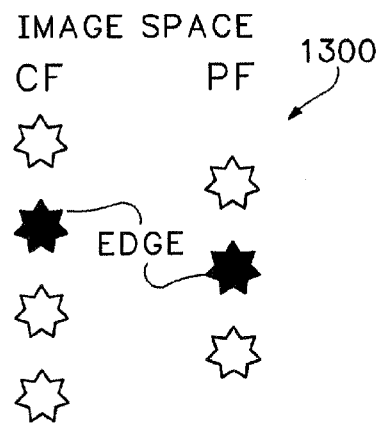
FIG. 13a is an illustration of a vertical edge.
Figure 13B:
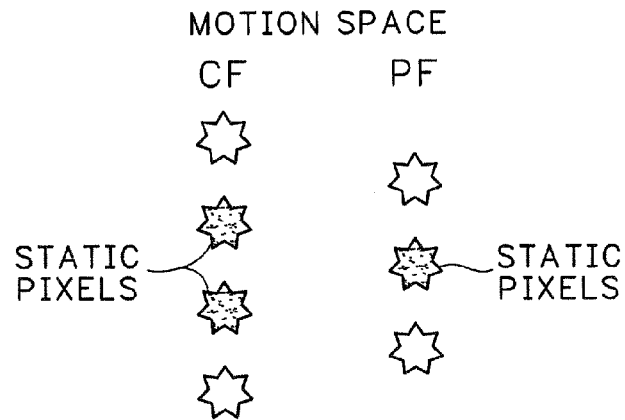
Figure 13C:
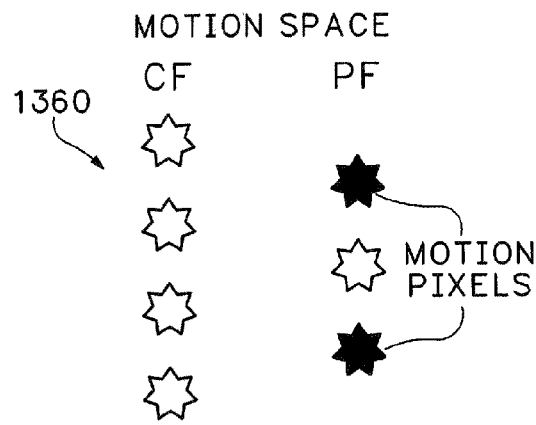

For example, a vertical edge appears in the middle region of the pixel window. The middle region is defined as the region between the center PF pixel and either of the two neighboring CF pixels in the decision window. Further, there is an associated and specific quantized motion pattern indicating the absence of inter-frame motion along that edge. Referring to FIG. 13a a vertical edge in the image space is illustrated generally by numeral 1300. Referring to FIG. 13b, the pixels illustrated in FIG. 13a are shown in the motion space. The motion space indicates that the edge and surrounding pixels are static, thereby confirming the presence of the edge. Alternately, if the pixels about the edge pixels indicate motion, they contradict the detecting of an edge, and the target pixel is not deemed to be static. Referring to FIG. 13c, an example of pixels in the motion space for such a case is illustrated generally by numeral 1360.

Programmable thresholds define the level of quantized motion that may be used to reject pixels as static. The rejection of supposedly static pixels is often required. Pixels may satisfy the static pixel pattern criteria however the surrounding information in the pixel window can exhibit patterns characteristic of pixels in motion. In these instances, treating the reference pixel (i.e., the pixel under consideration) as a static pixel can lead to undesirable image artifacts. This disqualification criterion is programmable, and can be adjusted to include any combination of quantized motion patterns required within the decision window.

In addition to the quantized motion rejection criteria, a motion structure pattern in the image space is also used to disqualify pixels from being considered static. The quantized motion calculation does not relate image pixel data between the CF and the PF. Rather, the quantized motion static determination is based primarily on differences between every other field. This makes it possible for a fast moving object to be treated as a "static" pixel even though feathering may exist. Including motion structure pattern criteria addresses this problem.

In summary, the static structure detector uses of all of the criteria listed above to determine whether a pixel should be considered static. If a pixel window has a valid vertical edge as determined by the edge structure detector, a corresponding static pixel pattern as determined by the static structure detection block, and is not disqualified by motion structure patterns (such as aliasing and feathering) or a structural pattern, then the target pixel is considered static.

The output of the MSD, ESD and SSD is fed to the filter selector (FS). The FS contains rules that determine which set of filter coefficients to use in the computation of the target pixel.

The Filter Selector

The filter selector (FS) determines which vertical-temporal (VT) filter to apply. It does so by taking the inputs from the MSD, ESD and the SSD, and applying rules to determine the most appropriate VT filter to apply.

The FS has access to a lookup table that stores several VT filters. It is understood that a special case of a static VT filter is a purely spatial filter. The VT filters are programmable. That is, they are not fixed and can be altered via an interface provided by a microprocessor. The VT filters can be applied to produce an interpolated target pixel on a pixel-by-pixel basis. In the present embodiment there are a minimum of three VT filters resident on a chip for the purposes of reasonable quality motion adaptive vertical temporal filtering. The minimum filter set includes a static motion vertical-temporal filter, a regular motion vertical-temporal filter, and a high motion vertical-temporal filter.

Each of these VT filters classes is categorized by respective temporal DC components. For example, the static motion vertical-temporal filter, the regular motion vertical temporal filter, and the high motion vertical-temporal filter correspond to a DC CF temporal component of 0.5, 0.75 and 1.2, respectively. In general, these numbers are programmable.

In addition to the temporal DC component, the respective frequency responses of the three classes of filters represent many more degrees of freedom. Having variability in the selection of the frequency responses allows for noise reduction. In the present embodiment, three types of frequency responses are used for each DC temporal component. Therefore, the number of VT filters used for MAVT filtering increases to at least nine. Table 7 illustrates the grouping of different spatio-temporal filters.

TABLE 7

Matrix representation of motion adaptive VT filtering

| Spatial/Temoral | STATIC | LOW | HIGH |
| --- | --- | --- | --- |
| SOFT | VTSS | VTSL | VTSH |
| NOMINAL | VTNS | VTNL | VTNH |
| SHARP | VTShS | VTShL | VTShH |

The terms SOFT, NOMINAL and SHARP refer directly to the associated spatial frequency response of the filters. The terms STATIC, LOW and HIGH refer to the temporal response of the filters. That is, the frequency response in the temporal direction. A SOFT filter has, in general, a −3 dB cutoff frequency that is lower than the one corresponding to the NOMINAL filter.

In order for temporal and spatial filtering to be effective, each level of spatial filtering is duplicated when a new temporal gain is needed. That is, if there are 4 levels of spatial filtering, (for example VERY SOFT, SOFT, NOMINAL and SHARP) and there exists 6 levels of motion adaptive VT filters, (for example STATIC, LOW, REGULAR, HIGH, VERY HIGH and EXTREMELY HIGH), a total of 24 different filters are stored. Therefore, the VERY SOFT spatial filter in this scenario is actually a collection of 6 filters, each characterized by a different temporal gain.

As previously described, the treatment of noise corresponds to the different types of spatial and temporal filters listed in Table 7. For instance the SOFT, NOMINAL and SHARP spatial filter types are used when confronted with a level of estimated noise that is high, medium and low, respectively.

The VT filters of Table 7 can be represented in an alternate manner as illustrated in Table 8. In Table 8, representative temporal gains are shown for varying degrees of motion. In the present embodiment, three levels of temporal gain reside within the design of the MAVT algorithm as illustrated in Table 7. However, more may be added.

TABLE 8

Vertical Temporal Filter Types

| VT Filter Type | CF Gain | PF Gain | CF Filter Type | PF Filter Type |
| --- | --- | --- | --- | --- |
| STATIC_MOTION1 | 0.50 | 0.50 | Soft | Soft |
| REGULAR_MOTION1 | 0.95 | 0.05 | Soft | Soft |
| HIGH_MOTION1 | 1.05 | −0.05 | Soft | Soft |
| STATIC_MOTION2 | 0.50 | 0.50 | Nominal | Nominal |
| REGULAR_MOTION2 | 0.95 | 0.05 | Nominal | Nominal |
| HIGH_MOTION2 | 1.05 | −0.05 | Nominal | Nominal |
| STATIC_MOTION3 | 0.50 | 0.50 | Sharp | Soft |
| REGULAR_MOTION3 | 0.95 | 0.05 | Sharp | Soft |
| HIGH_MOTION3 | 1.05 | −0.05 | Sharp | Sharp |

The filter selection determines which of the VT filters, resident in memory, to apply based upon results of the quantizer, the edge structure detector, the motion structure detector, the static structure detector, and the auxiliary pixel information.

The filter selector selects the VT filter from a look-up table resident memory that houses the vertical-temporal filters shown in Table 8. For example, if it is determined in the region about a target pixel that there is substantial inter-field motion, and there is no significant estimated noise in the region, then the HIGH_MOTION3 VT Filter is applied.

A HIGH_MOTION VT filter is only applied if a motion structure, such as feathering, is present in the pixel window. A REGULAR_MOTION VT filter is applied if a vertical edge is present, or if any of the CF reference pixels, and one of its neighboring CF pixels, exhibit a quantized motion value less than or equal to the regular motion criteria. A STATIC_MOTION VT filter is applied if the SSD indicates the pixel window is static. If none of the above criteria is met, the default value is the REGULAR VT Filter.

Pseudo code for selecting the VT filter is given below.

```
if( Pixel Window is Static )
{
    Temporal Filter Level = STATIC_VT_FILTER
}
else if( Vertical Edge is Present)
{
    Temporal Filter Level = REGULAR_VT_FILTER
}
else if(   (QMotion CF(1,1) <= MOTIONTYPE_REGULAR) AND
        (
            (QMotion CF(1,0) <= MOTIONTYPE_REGULAR) ||
            (QMotion CF(1,2) <= MOTIONTYPE_REGULAR) ||
            (QMotion CF(2,1) <= MOTIONTYPE_REGULAR)
        )
    )
{
    Temporal Filter Level = REGULAR_VT_FILTER
}
else if(   (QMotion CF(2,1) <= MOTIONTYPE_REGULAR) AND
        (
            ( QMotion CF(2,0) <= MOTIONTYPE_REGULAR ) ||
            ( QMotion CF(2,2) <= MOTIONTYPE_REGULAR ) ||
            ( QMotion CF(1,1) <= MOTIONTYPE_REGULAR )
        )
    )
{
    Temporal Filter Level = REGULAR_VT_FILTER
}
else if( MOTION_STRUCTURE )
{
    Temporal Filter Level = HIGH_VT_FILTER
}
else
{
    Temporal Filter Level = REGULAR_VT_FILTER
}
```

In the present embodiment, the MAVT filter operates on data within the image window. In particular, the CFF and the PFF are applied to pixel values within the window and, via a convolution, are used to generate an output target pixel. The selection of input pixels for creating the target pixel is typically four from the current field and three from the previous field. These pixels are chosen to lie in one of a plurality of contours. Some of these contours are illustrated in FIG. 7, and include non-linear contours.

The choice of the contour depends upon several factors, but primarily depends on local content of the image scene such as lines and edges. Directional interpolation results in interpolated images that are of superior quality and do not exhibit some of the stair-stepping artifacts. However, the interpolation is improved even further by extending the notion of directional interpolation to include non-linear contours such as those illustrated in FIG. 7. Non-linear directional interpolation does not require that pixels used by the filter are co-linear.

While above description refers to specific embodiments, various modifications will be apparent to those skilled in the art without departing from the spirit or scope of the invention as defined in the claims attached hereto.

We claim:

1. An adaptive filter, comprising:
    quantized motion calculating means for calculating a motion amount about a target pixel from an interlaced video signal including a plurality of frames, each frame including an even and an odd field;
    filter selecting means for selecting a filter by applying a first weighting factor to a plurality of current field pixels and a second weighting factor to a plurality of previous field pixels responsive to the motion amount to thereby create the target pixel.

2. The adaptive filter of claim 1 where the quantized motion calculating means is adapted for estimating the motion amount about the target pixel by calculating a difference between first and second pixels, the first and second pixels being spatially equivalent and temporally different by one frame, the different being quantized responsive to a plurality of thresholds.

3. The adaptive filter of claim 2 where if the motion amount is static, the quantized motion calculating means is adapted for providing a corresponding value indicating the number of consecutive frames said first pixel location has been static.

4. The adaptive filter of claim 3 where the corresponding value is appended to the target pixel.

5. The adaptive filter of 1 comprising:
    feathering detector means for detecting a feathering artifact about the target pixel.

6. The adaptive filter of claim 5 where the feathering detector means is adapted for detecting feathering if each of a plurality of pixel differences along a predetermined contour exceeds corresponding predetermined thresholds.

7. The adaptive filter of claim 6 where the predetermined contour is non-linear.

8. The adaptive filter of claim 6 where the predetermined thresholds are independent of each other.

9. The adaptive filter of claim 6 where the feathering detector means is adapted for detecting feathering if each of the plurality of pixel differences exceeds the corresponding predetermined thresholds for a predetermined number of fields.

10. The adaptive filter of claim 9 where the feathering detector means is adapted for detecting feathering concurrently over a plurality of different values for the predetermined number of consecutive fields.

11. The adaptive filter of claim 6 where the feather detecting means is adapted for appending a corresponding value indicating whether or not feathering is present to the target pixel.

12. The adaptive filter of claim 1 comprising:
    edge detecting means for detecting static edges about the target pixel.

13. The adaptive filter of claim 12 where the edge detecting means is adapted for detecting spatiotemporal edges in the even and odd fields by calculating a difference between pixels in the even and odd fields.

14. The adaptive filter of claim 13 where if the edge detecting means detects an edge, a corresponding value is provided for indicating a number of consecutive fields the edge has been present.

15. The adaptive filter of claim 14 where the corresponding value is appended to the target pixel.

16. The adaptive filter of claim 12 where the edge detecting means is adapted for detecting an edge structure by looking for an edge followed by a flat portion followed by another edge.

17. The adaptive filter of claim 1 comprising:
    filter applying means for applying the filter to a contour of current and previous field pixels for interpolating a target pixel.

18. The adaptive filter of claim 17 where the contour is non-linear.

19. An adaptive filter comprising:
a motion calculator to calculate motion about a target pixel from an interlaced video signal; and
a filter selector to select a filter responsive to the motion, the filter being adapted to apply a weight factor to pixels in current and previous fields;
where the filter is adapted to apply a first weight factor to pixels in the current field;
where the filter is adapted to apply a second weight factor to pixels in the previous field;
where the motion calculator is adapted to calculate the motion according to a plurality of predefined thresholds; and
where the motion calculator is adapted to indicate a number of consecutive frames the first pixel is static.

20. The adaptive filter of claim 19 where the number of consecutive frames is appended to information related to the target pixel.

* * * * *